(12) United States Patent
Ko et al.

(10) Patent No.: US 11,307,870 B2
(45) Date of Patent: Apr. 19, 2022

(54) WEARABLE DEVICE AND METHOD OF CONTROLLING THE SAME

(71) Applicant: SAMSUNG ELECTRONICS CO., LTD., Suwon-si (KR)

(72) Inventors: Jae-woo Ko, Uiwang-si (KR); Dong-wook Kwon, Suwon-si (KR); Jeong-hoon Park, Seoul (KR); Ga-hyun Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 16/537,259

(22) Filed: Aug. 9, 2019

(65) Prior Publication Data

US 2019/0361716 A1 Nov. 28, 2019

Related U.S. Application Data

(63) Continuation of application No. 15/308,194, filed as application No. PCT/KR2015/006360 on Jun. 23, 2015, now Pat. No. 10,379,877.

(51) Int. Cl.
*G06F 1/24* (2006.01)
*G06F 9/445* (2018.01)
(Continued)

(52) U.S. Cl.
CPC .......... *G06F 9/44505* (2013.01); *G06F 1/163* (2013.01); *H04W 4/80* (2018.02); *G06F 9/4411* (2013.01)

(58) Field of Classification Search
CPC ....... G06F 9/44505; G06F 1/163; H04W 4/80
(Continued)

(56) References Cited

U.S. PATENT DOCUMENTS 6,247,811 B1 * 6/2001 Rhoades ................ G02C 11/08
351/156
2005/0071647 A1 3/2005 Fujinuma et al.
(Continued)

FOREIGN PATENT DOCUMENTS

EP 2 818 964 12/2014
JP 2009-295350 12/2009
(Continued)

OTHER PUBLICATIONS

Office Action dated Mar. 22, 2021 in Korean Patent Application No. 10-2014-0172384 and English-language translation.
(Continued)

*Primary Examiner* — Volvick Derose
(74) *Attorney, Agent, or Firm* — Nixon & Vanderhye, P.C.

(57) ABSTRACT

A wearable device includes first and second electronic modules, a connection module configured to electrically connect the first electronic module to the second electronic module, and a length adjusting module of which length is adjustable to bring the connection module in contact with a user. The length adjusting module comprises first and second fastening units configured to be assembled and disassembled and configured to be locked together in a fastened position when assembled. When the first and second fastening units are assembled, the first fastening unit is electrically connected to the second fastening unit and a length of the length adjusting module is adjusted.

9 Claims, 24 Drawing Sheets

(51) Int. Cl.
*G06F 1/16* (2006.01)
*H04W 4/80* (2018.01)
*G06F 9/4401* (2018.01)

(58) Field of Classification Search
USPC ........................................................ 713/100
See application file for complete search history.

(56) References Cited

U.S. PATENT DOCUMENTS

| | | | |
|---|---|---|---|
| 2008/0054039 A1 | 3/2008 | Wulff et al. | |
| 2009/0151040 A1* | 6/2009 | Lee-Johnson | A41D 13/04 2/51 |
| 2011/0123050 A1* | 5/2011 | Garra | B65H 75/4473 381/123 |
| 2011/0170703 A1* | 7/2011 | Palma | H04R 1/1041 381/74 |
| 2011/0209374 A1* | 9/2011 | Padgett | A44C 5/0015 40/633 |
| 2011/0210931 A1* | 9/2011 | Shai | G06F 3/04883 345/173 |
| 2012/0101602 A1 | 4/2012 | Andren et al. | |
| 2013/0069787 A1 | 3/2013 | Petrou | |
| 2014/0055167 A1 | 2/2014 | Oh et al. | |
| 2014/0180365 A1* | 6/2014 | Perryman | H01Q 1/273 607/60 |
| 2014/0378113 A1* | 12/2014 | Song | H04M 1/72448 455/418 |
| 2015/0172832 A1 | 6/2015 | Sharpe et al. | |
| 2016/0299483 A1 | 10/2016 | Tong et al. | |
| 2016/0370605 A1* | 12/2016 | Ain-Kedem | G06K 9/00604 |

FOREIGN PATENT DOCUMENTS

| | | |
|---|---|---|
| KR | 10-2010-0002017 | 1/2010 |
| KR | 10-1171026 | 7/2012 |
| KR | 10-2013-0039918 | 4/2013 |
| KR | 10-2015-0057122 | 5/2015 |
| WO | 2006-036377 | 4/2006 |
| WO | 2012/170305 | 12/2012 |

OTHER PUBLICATIONS

International Search Report for PCT/KR2015/006360, dated Aug. 28, 2015, 4 pages.
Written Opinion of the ISA for PCT/KR2015/006360, dated Aug. 28, 2015, 7 pages.
Extended European Search Report for EP Application No. 15786209.5, dated Oct. 27, 2017, 5 pages.
Communication pursuant to Article 94(3) EPC dated Mar. 4, 2019 in counterpart European Patent Application No. 15786209.5.

* cited by examiner

[Fig. 1a]
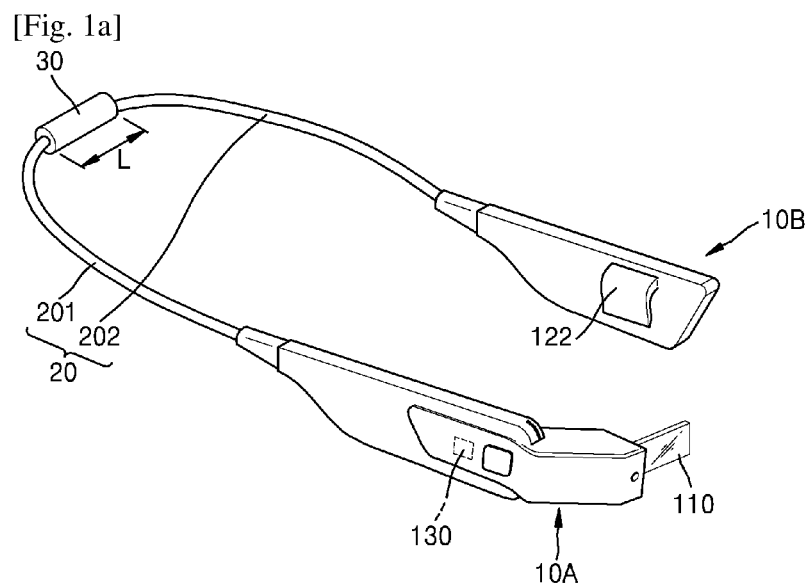
[Fig. 1b]
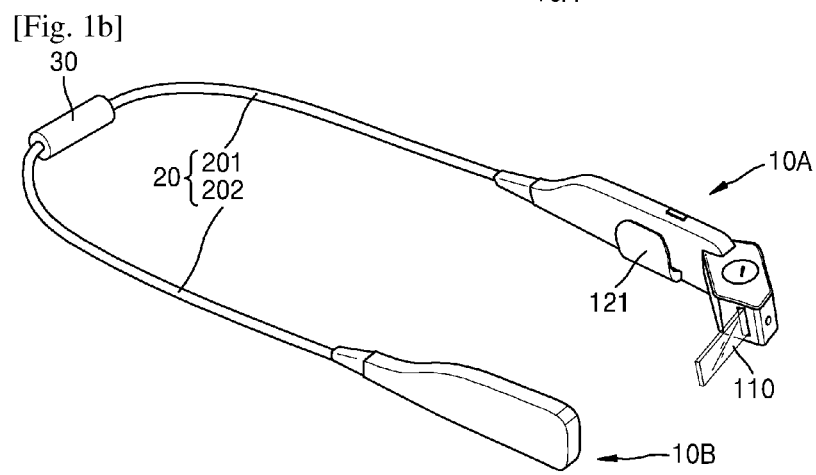
[Fig. 2]
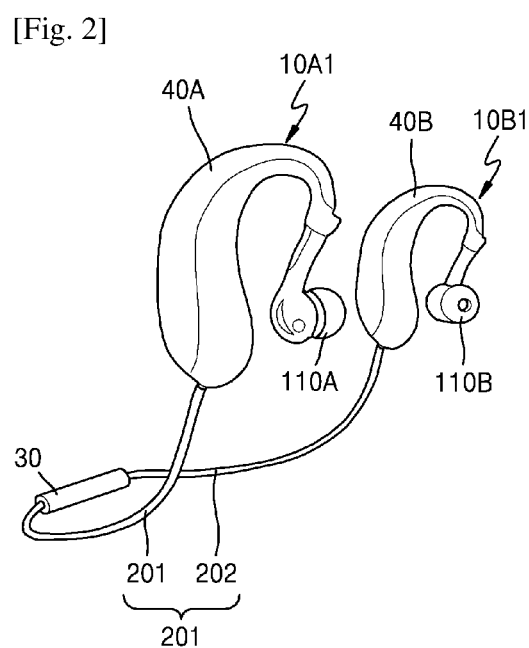

[Fig. 3a]
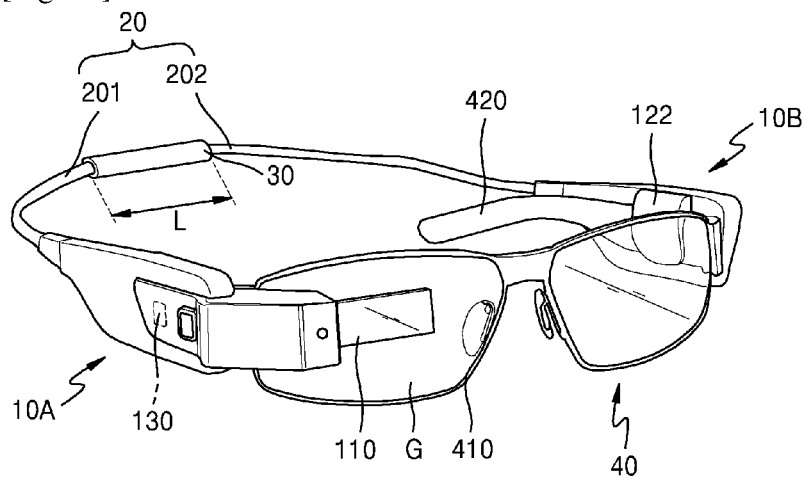
[Fig. 3b]
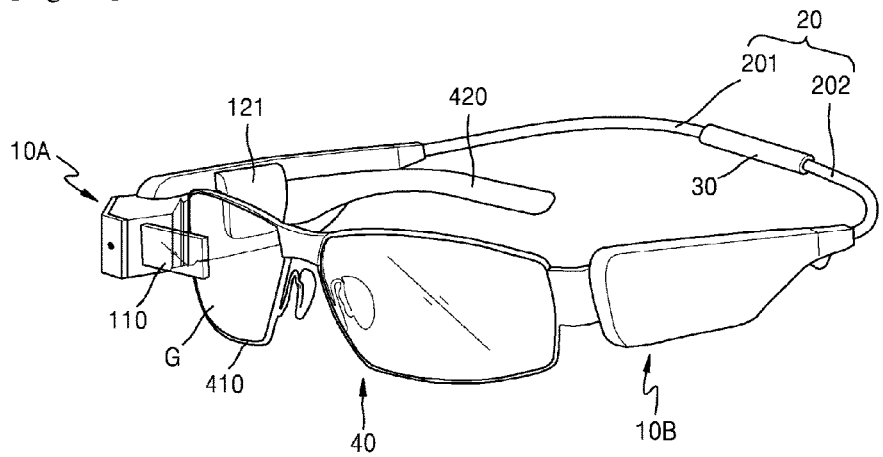
[Fig. 4]
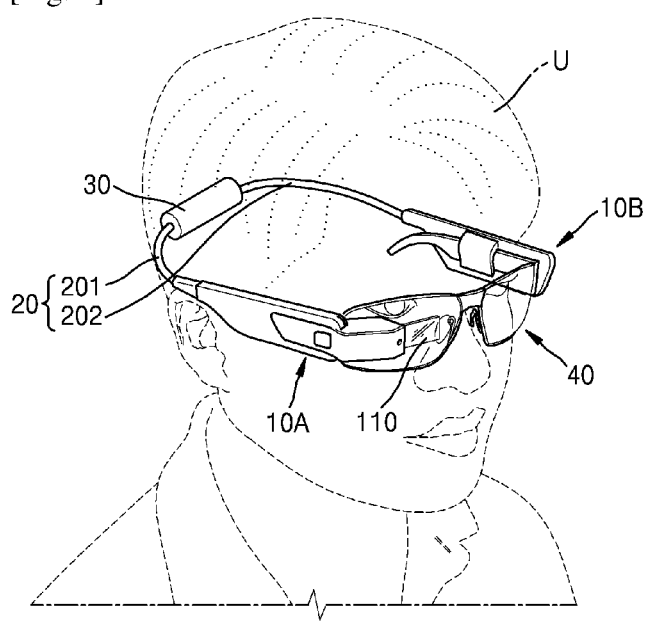

[Fig. 5a]
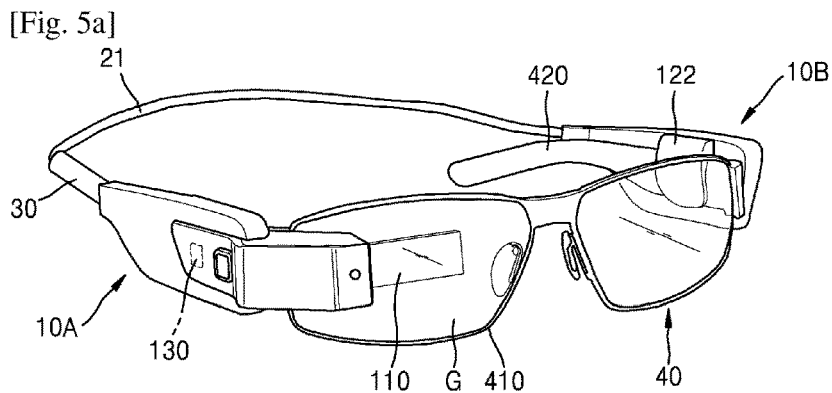
[Fig. 5b]
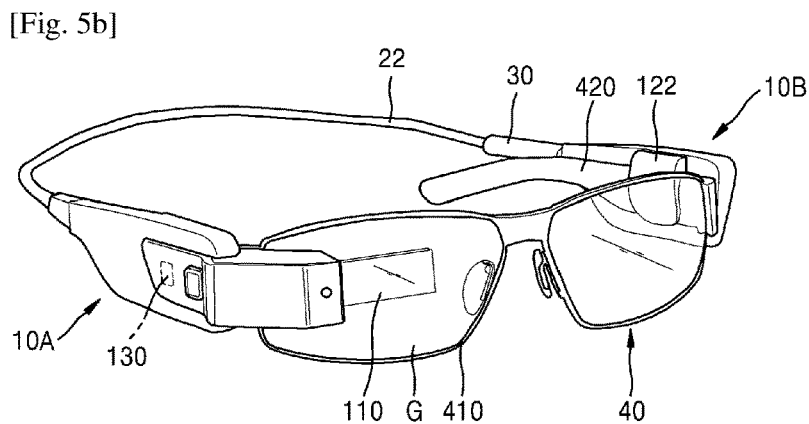
[Fig. 6a]
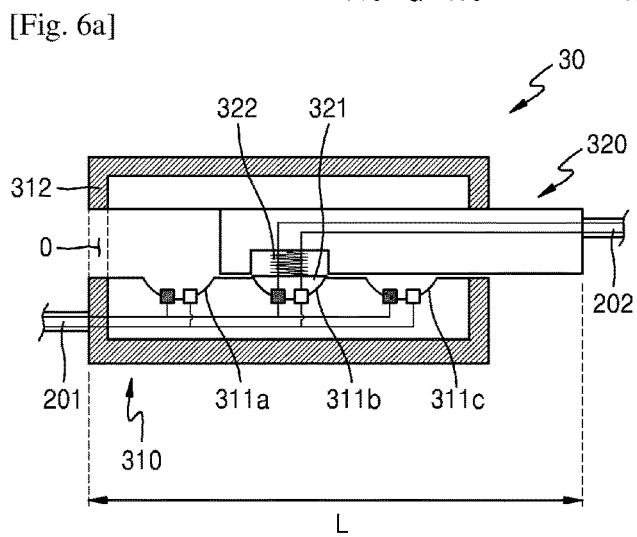
[Fig. 6b]
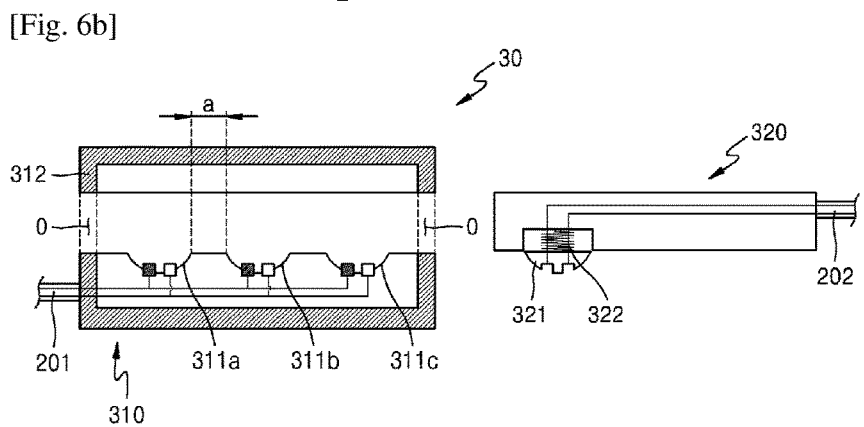

[Fig. 7a]
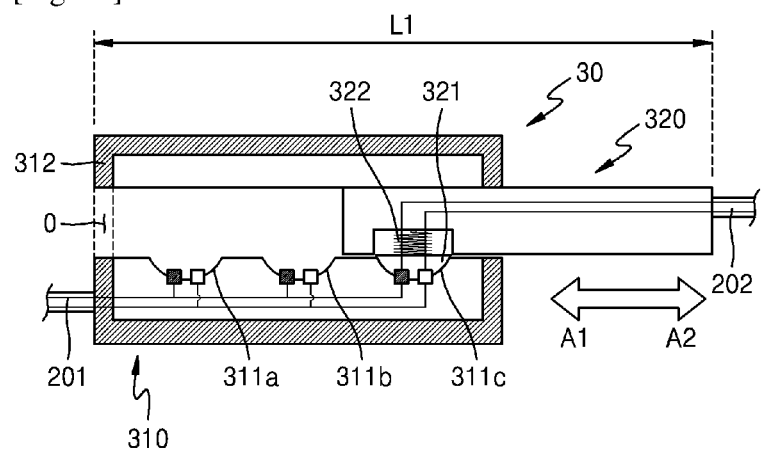
[Fig. 7b]
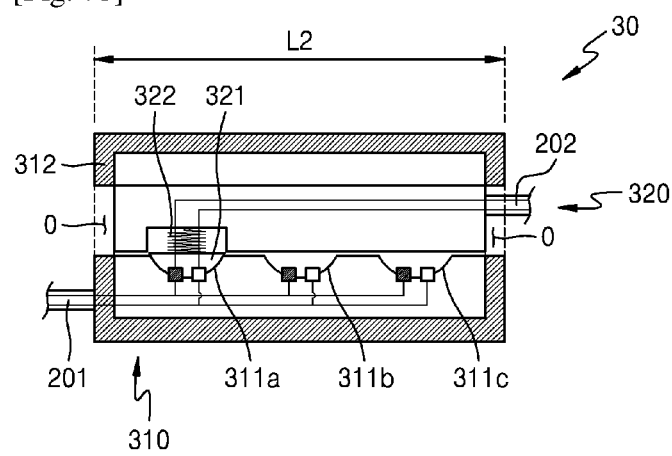
[Fig. 8a]
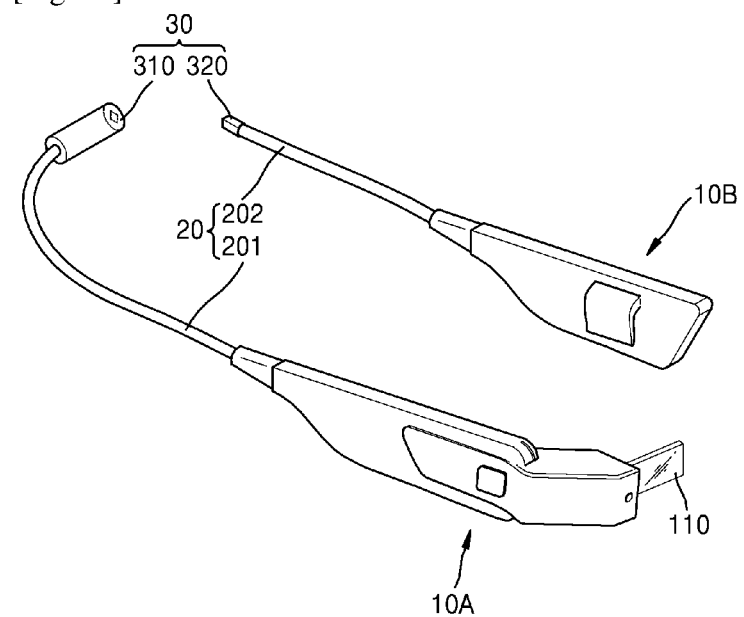

[Fig. 8b]
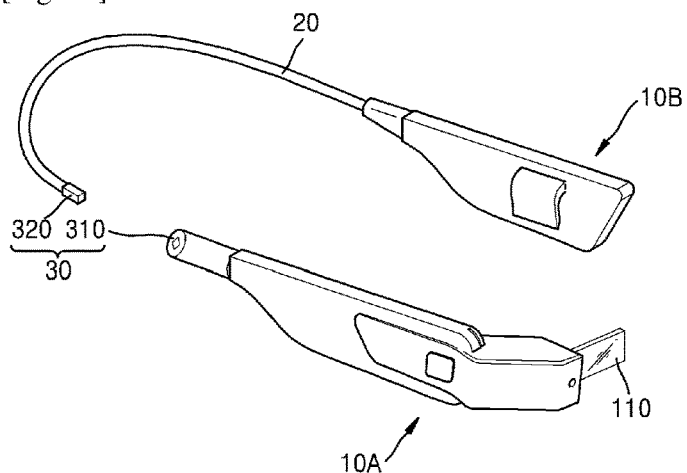
[Fig. 9]
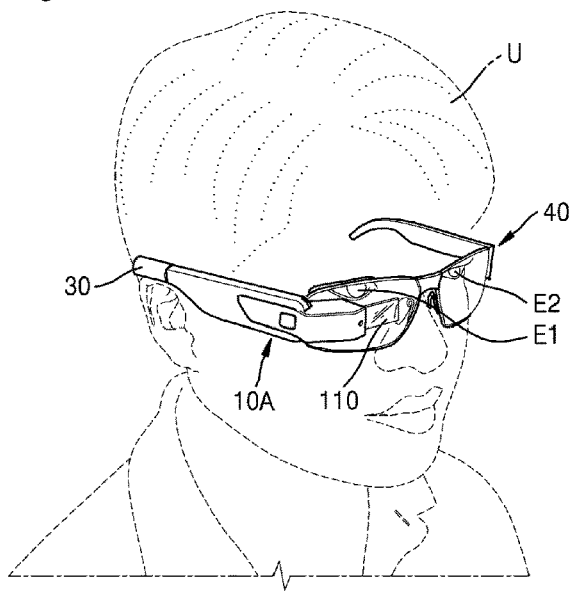
[Fig. 10]
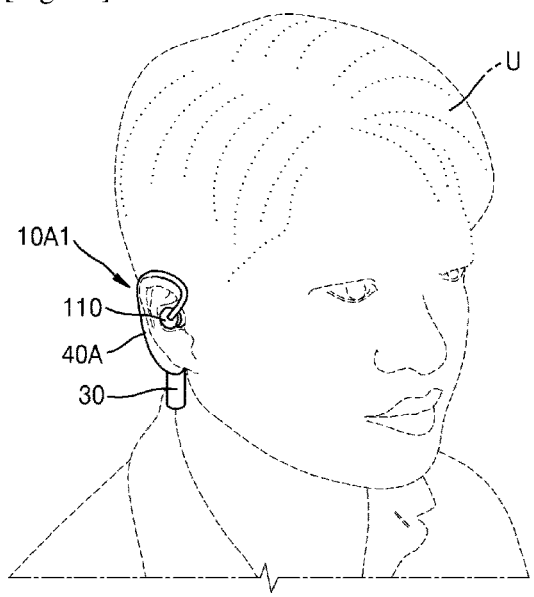

[Fig. 11a]
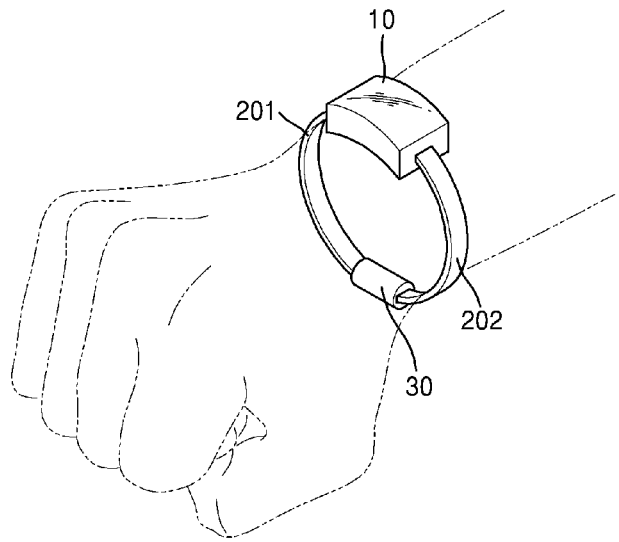
[Fig. 11b]
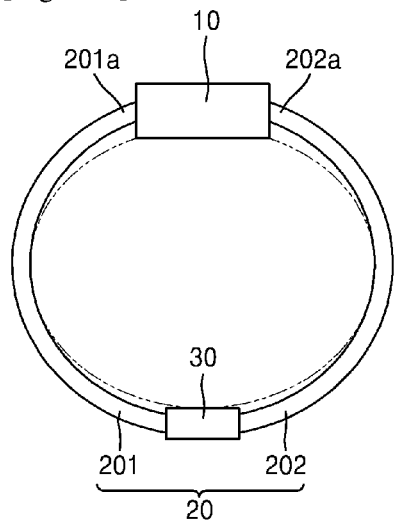
[Fig. 12]
| DETERMINE FIRST WEARING LENGTH OF WEARABLE DEVICE, BASED ON ELECTRICAL CONTACT INFORMATION BETWEEN FIRST FASTENING UNIT AND SECOND FASTENING UNIT OF WEARABLE DEVICE | — S1210 |
↓
| SET INFORMATION OF DETERMINED FIRST WEARING LENGTH AS WEARING LENGTH INFORMATION CORRESPONDING TO FIRST MODE OF USER OF WEARABLE DEVICE | — S1220 |

[Fig. 13]
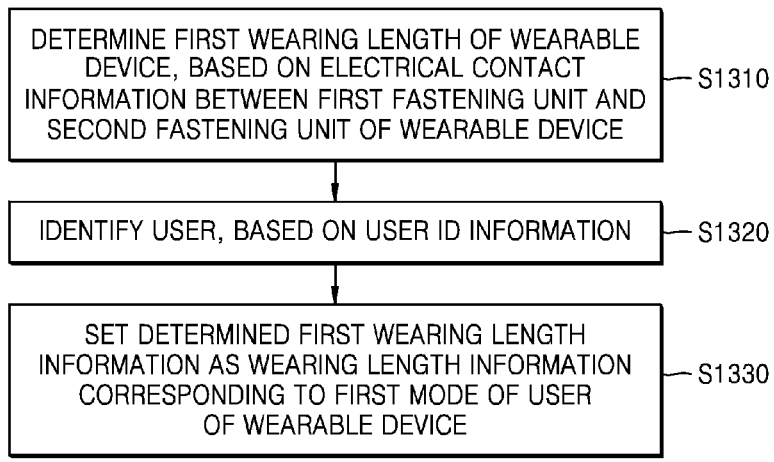
[Fig. 14]
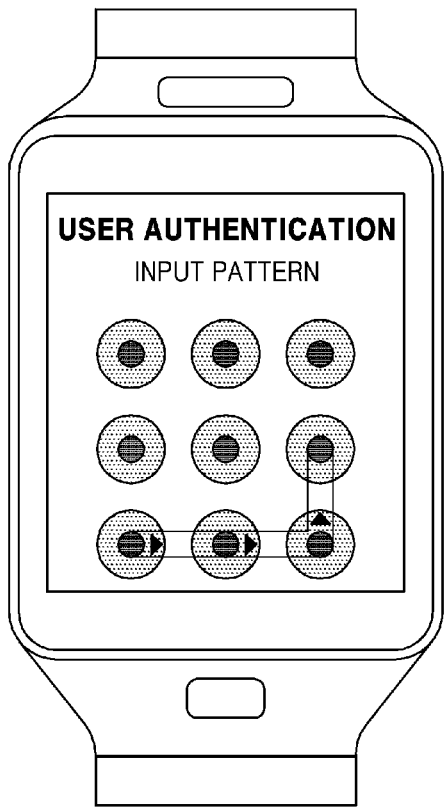

[Fig. 15]
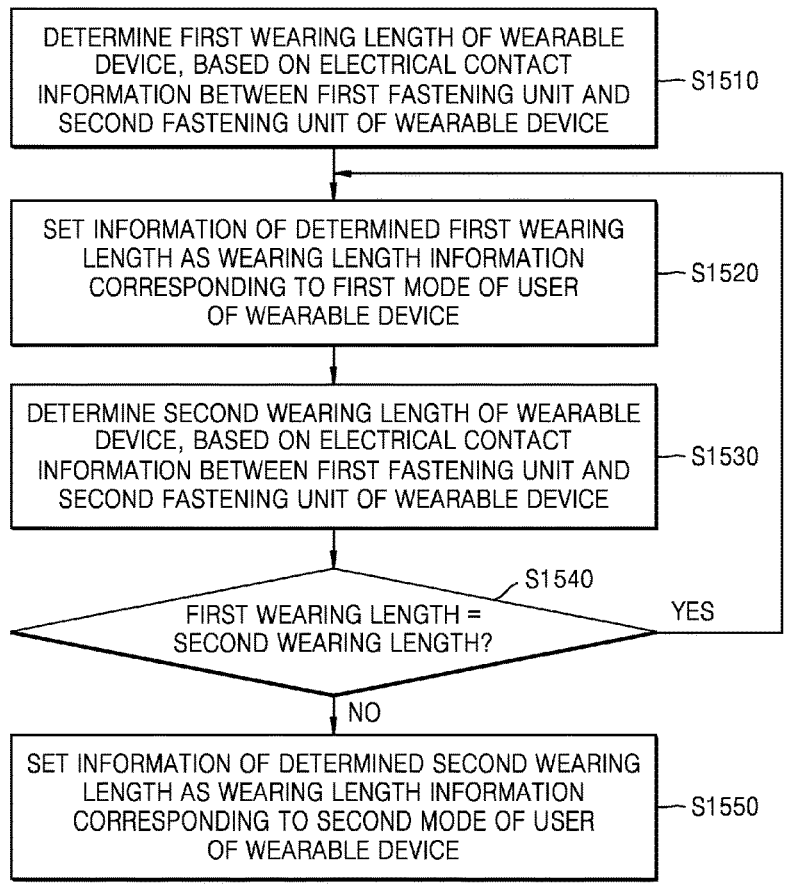
[Fig. 16]
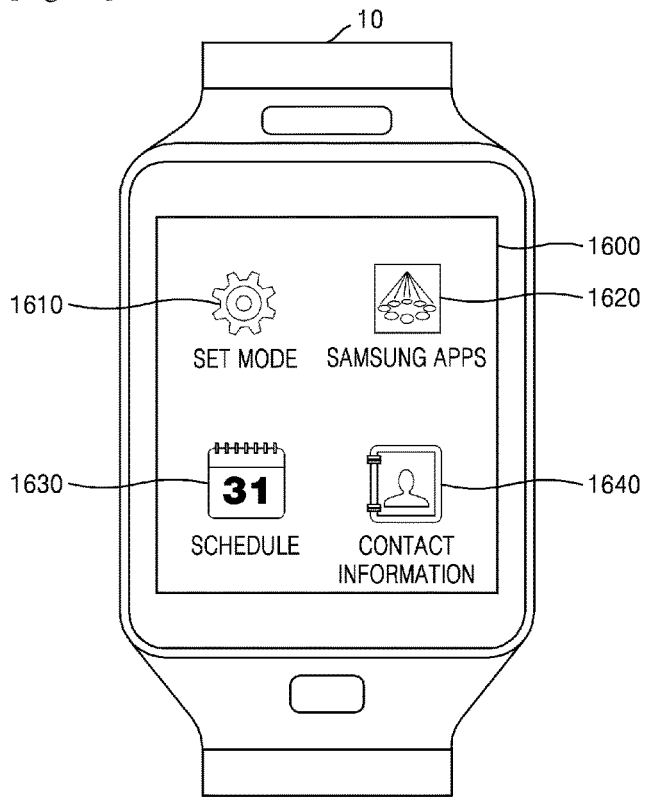

[Fig. 17]
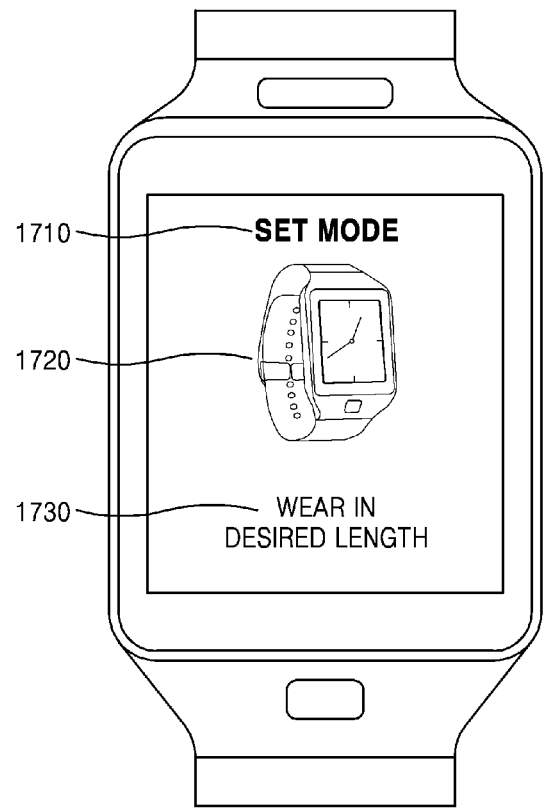
[Fig. 18]
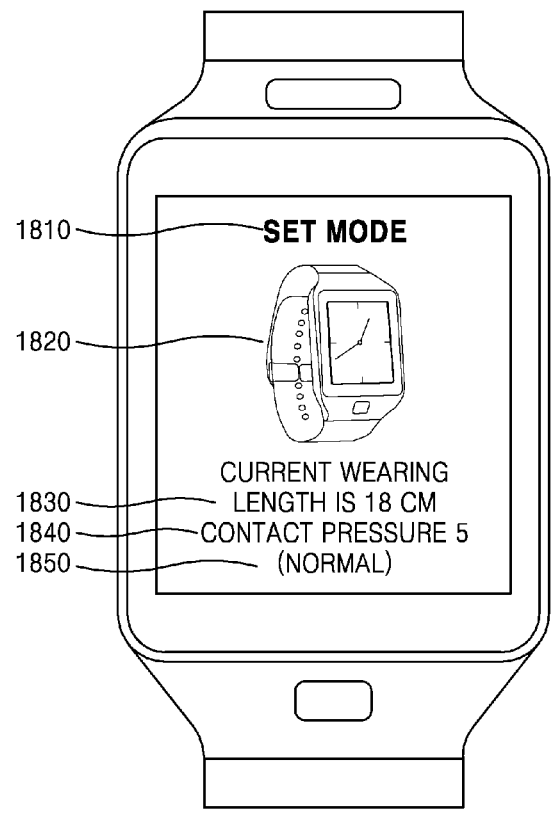

[Fig. 19]
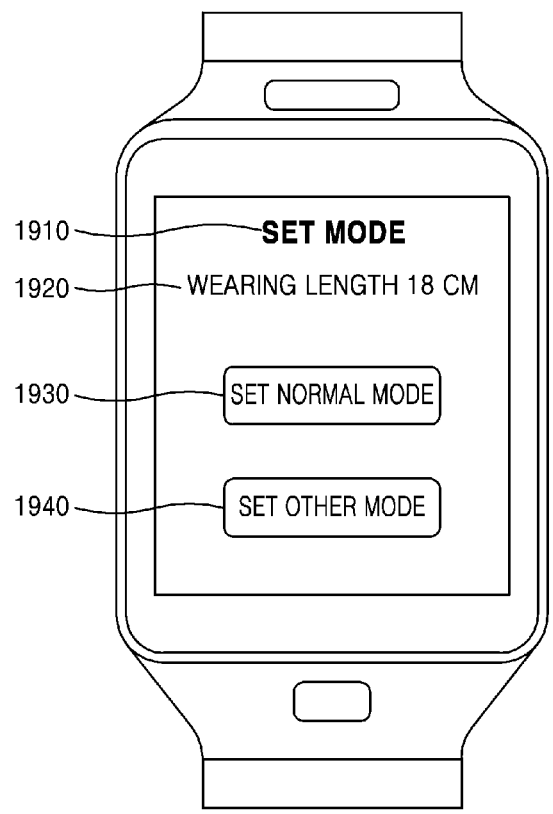
[Fig. 20]
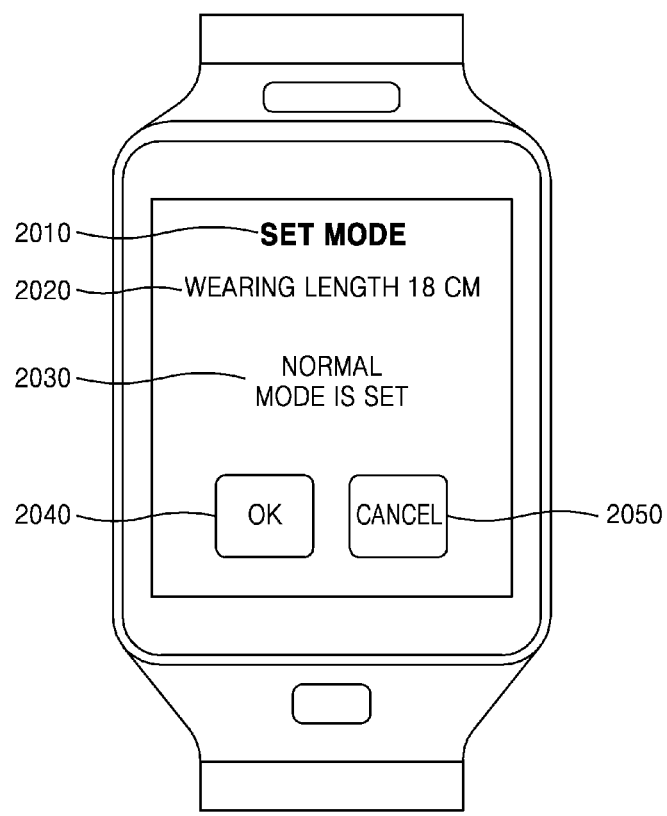

[Fig. 21]
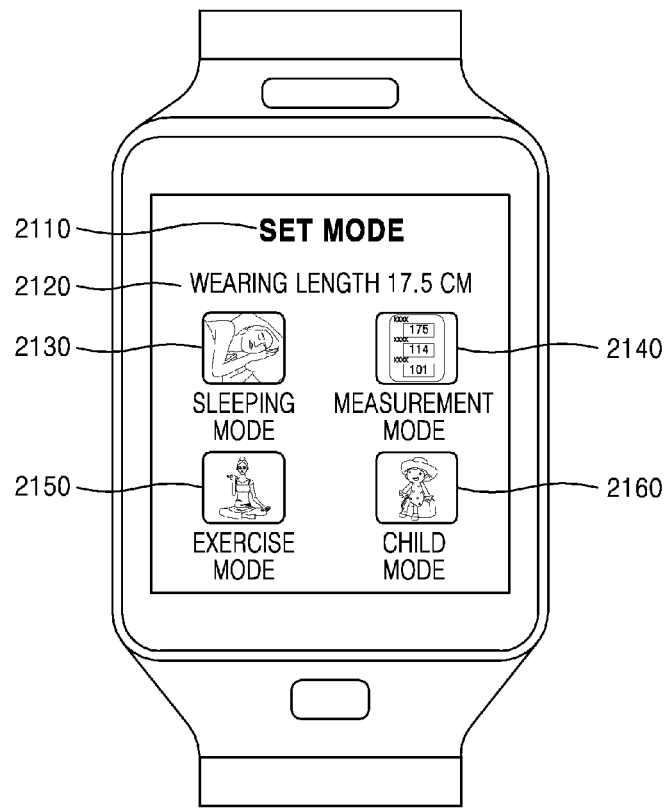
[Fig. 22]
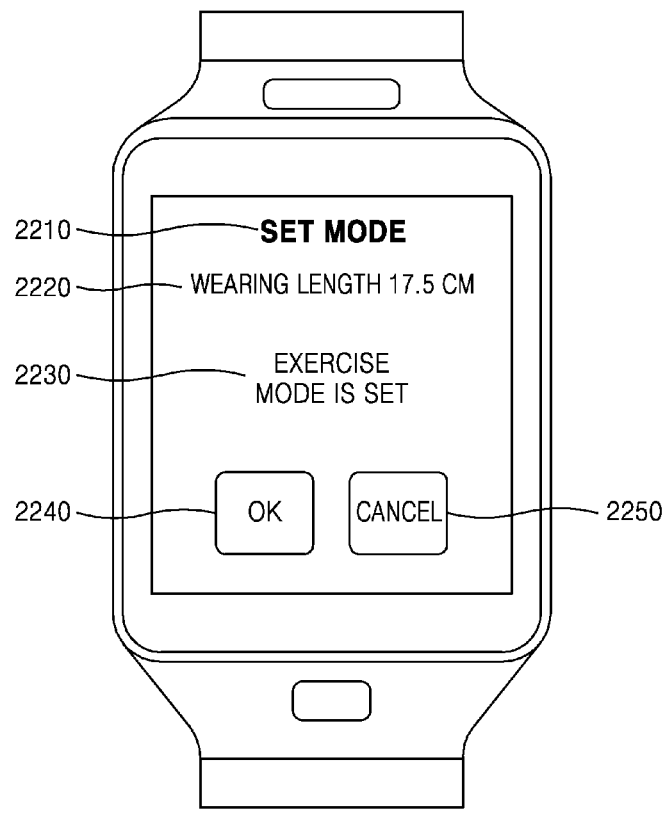

[Fig. 23]
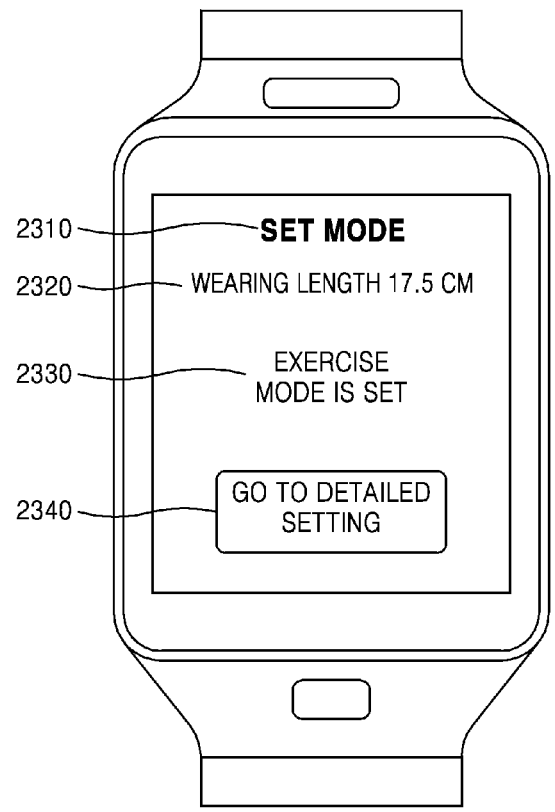
[Fig. 24]
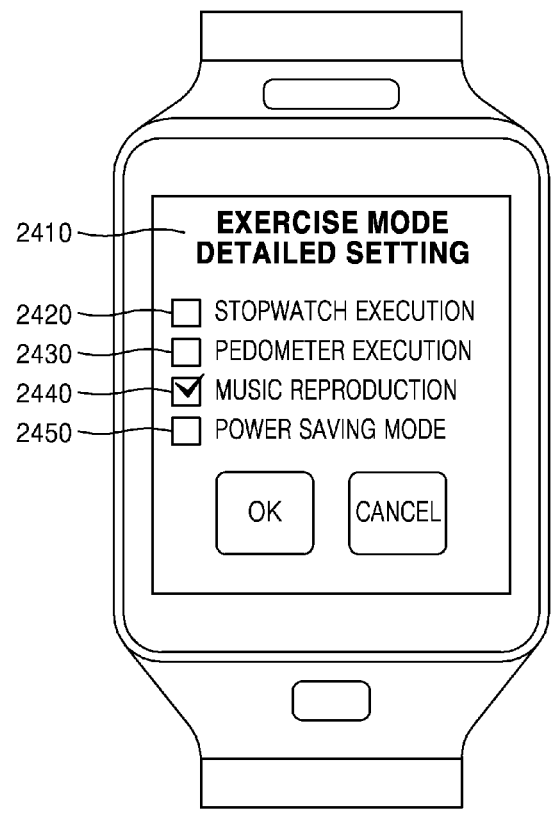

[Fig. 25]
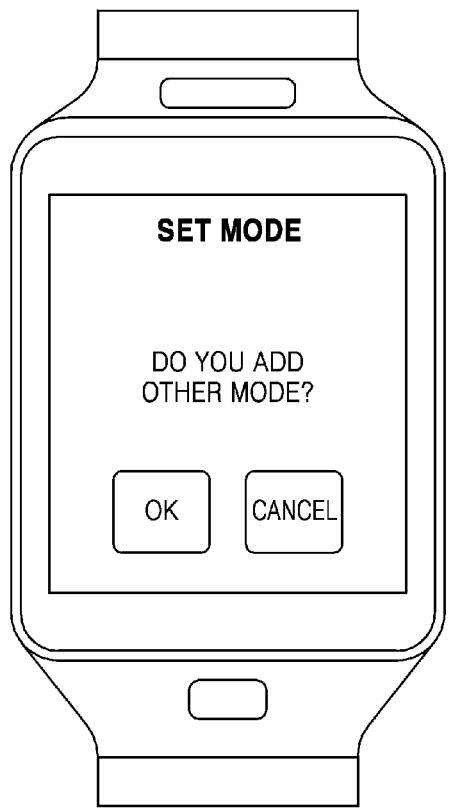
[Fig. 26]
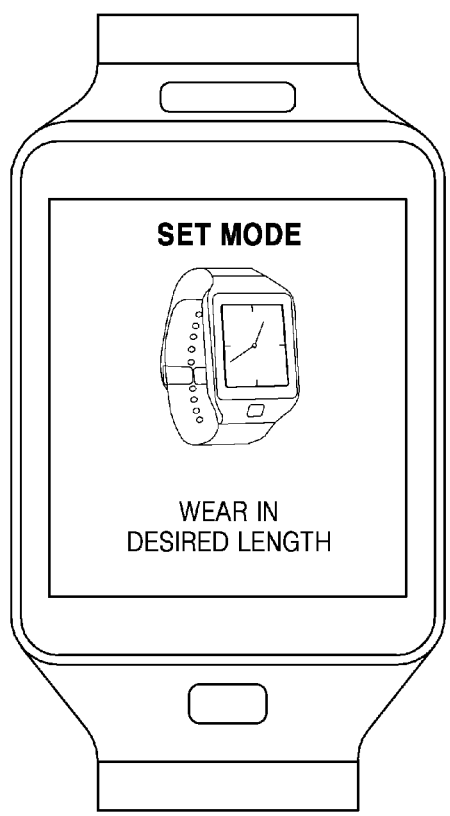

[Fig. 27]
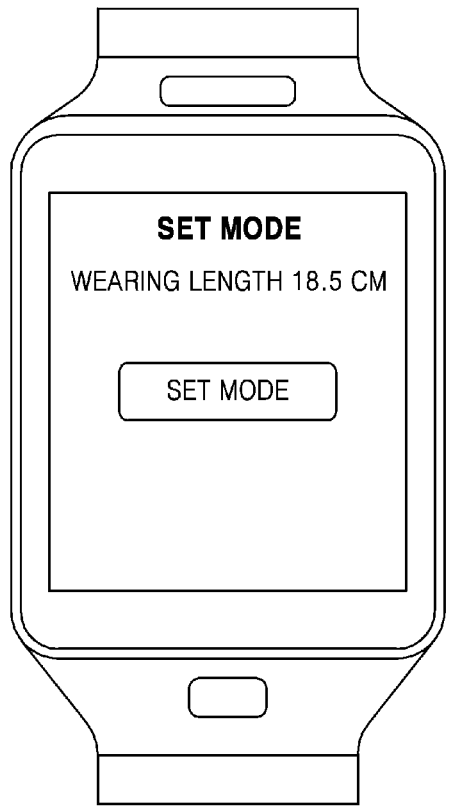
[Fig. 28]
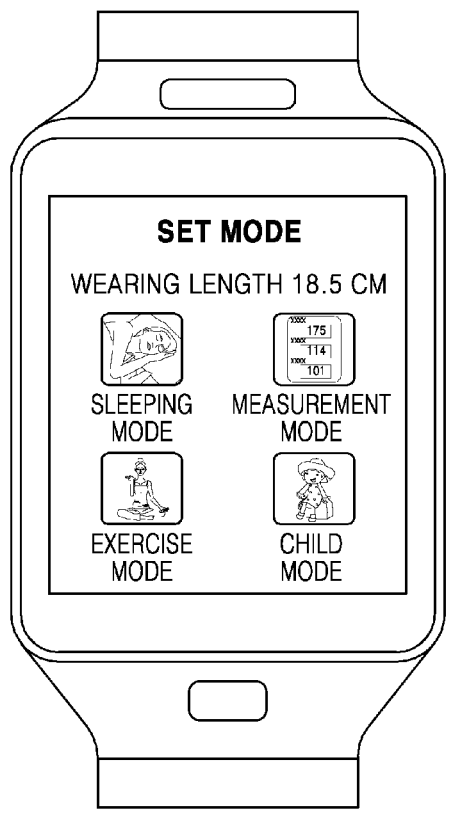

[Fig. 29]
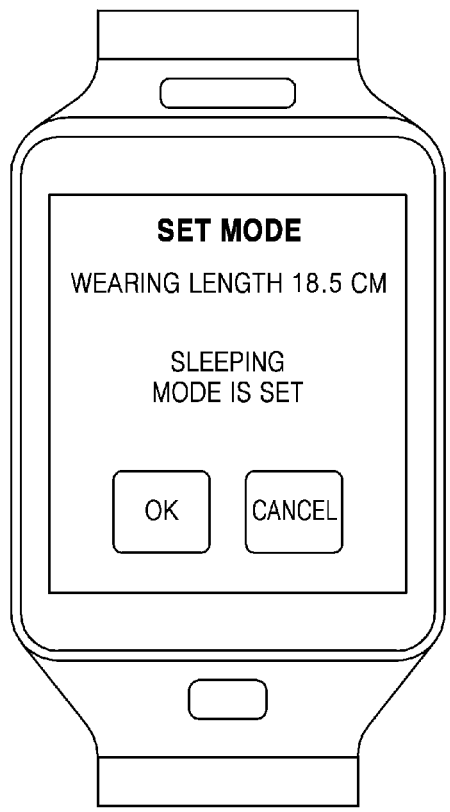
[Fig. 30]
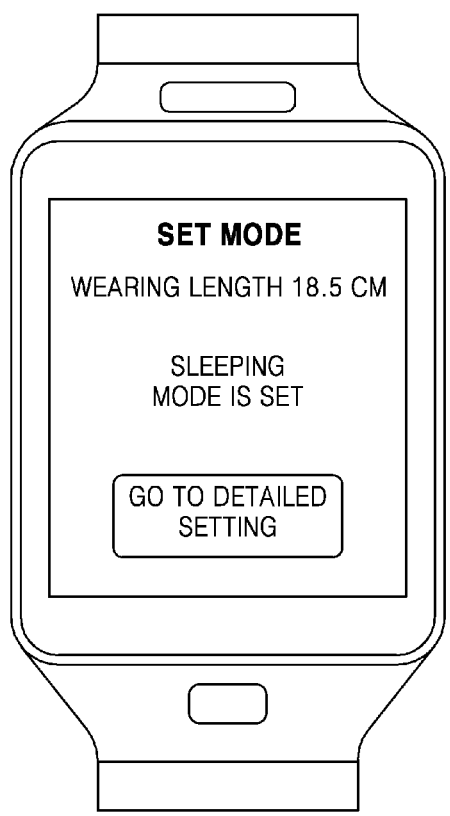

[Fig. 31]
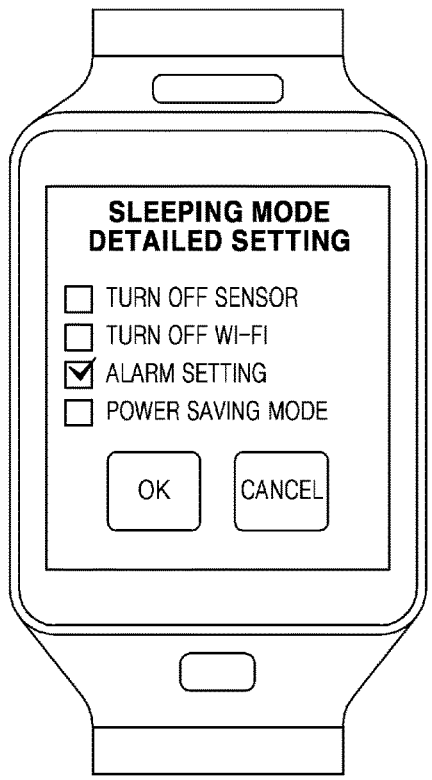
[Fig. 32]
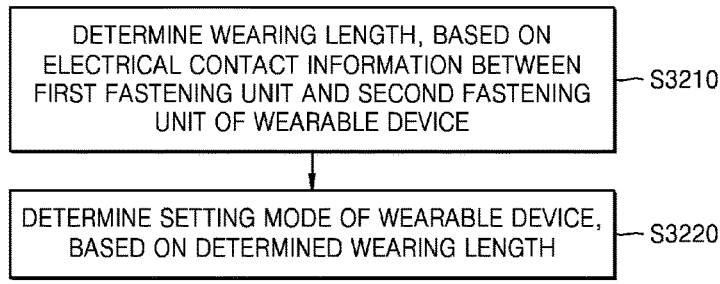
[Fig. 33]
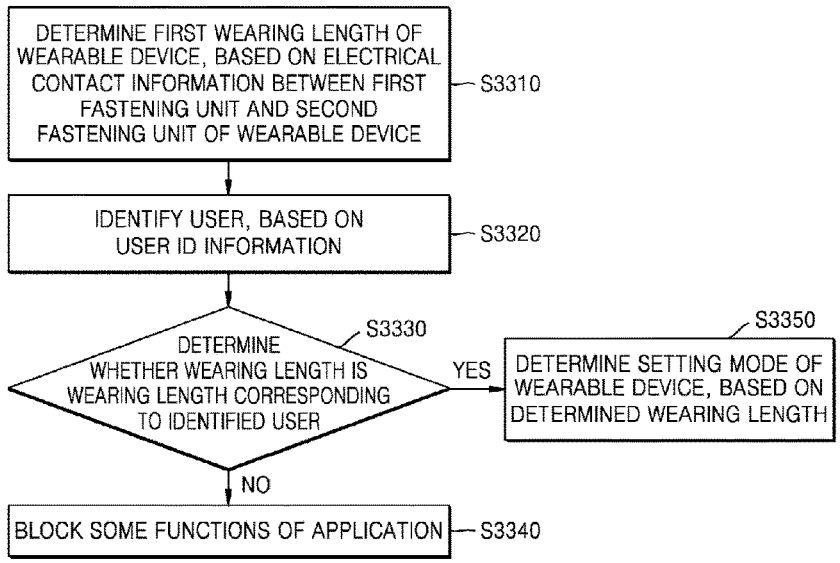

[Fig. 34]
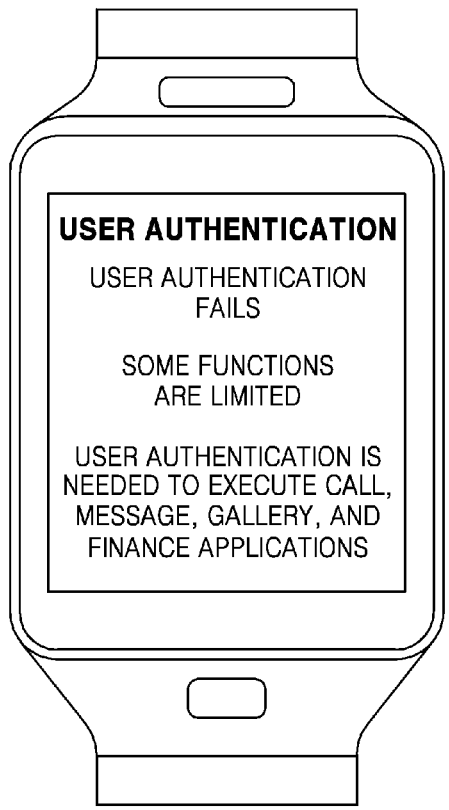
[Fig. 35]
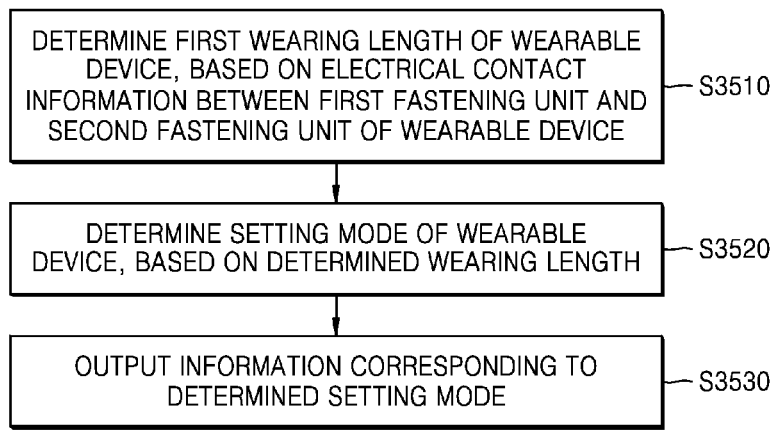

[Fig. 36]
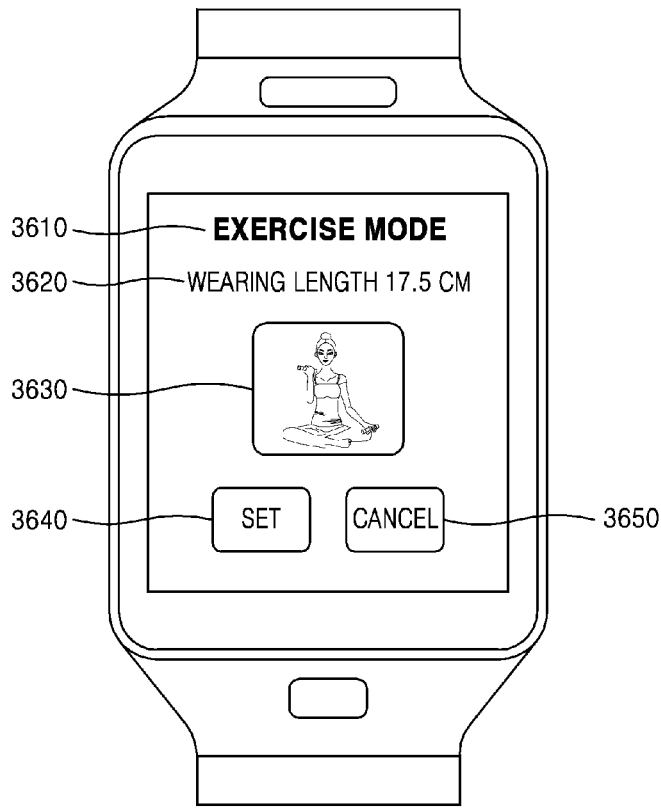
[Fig. 37]
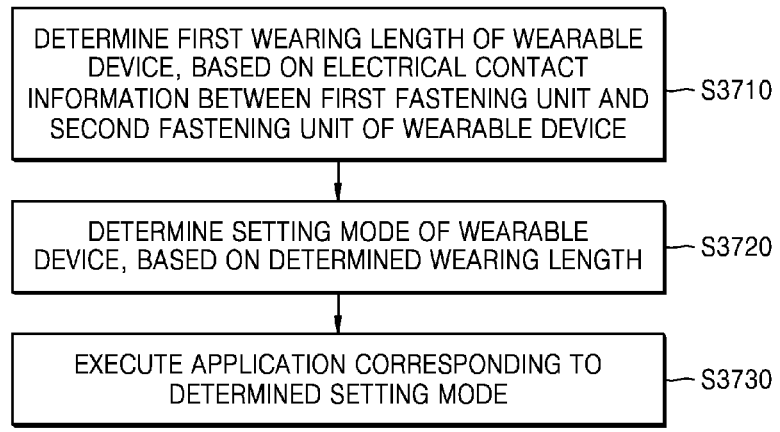

[Fig. 38]
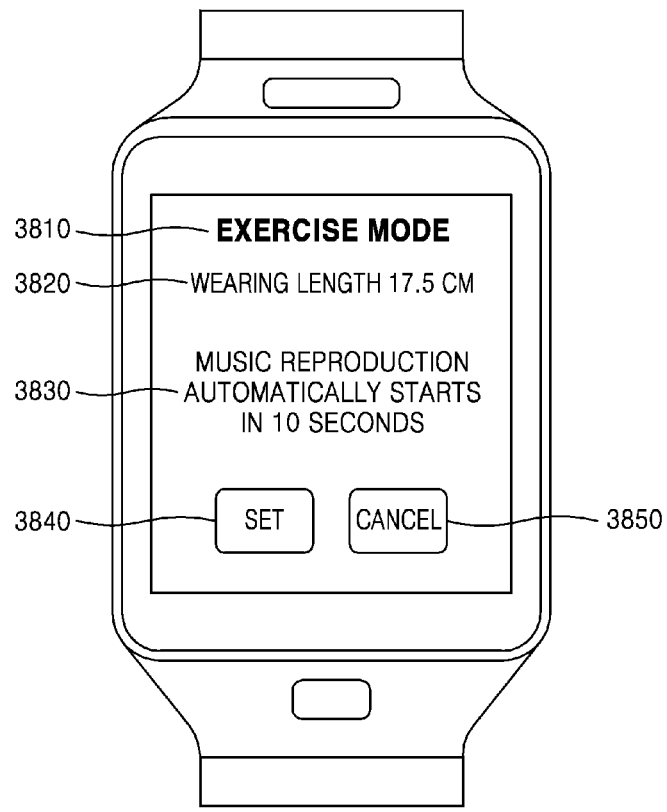
[Fig. 39]
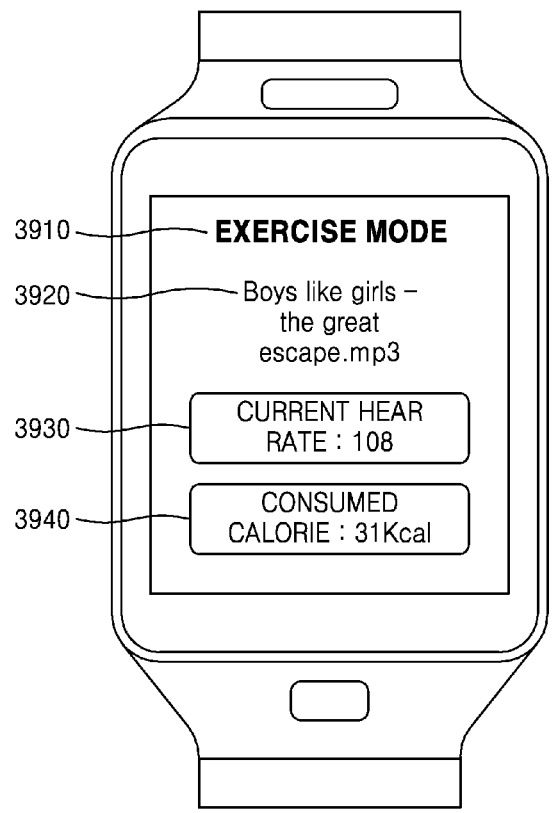

[Fig. 40]
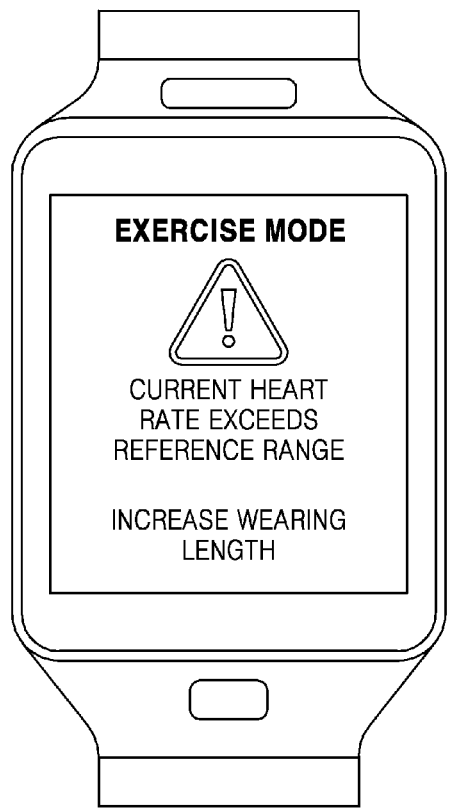
[Fig. 41]
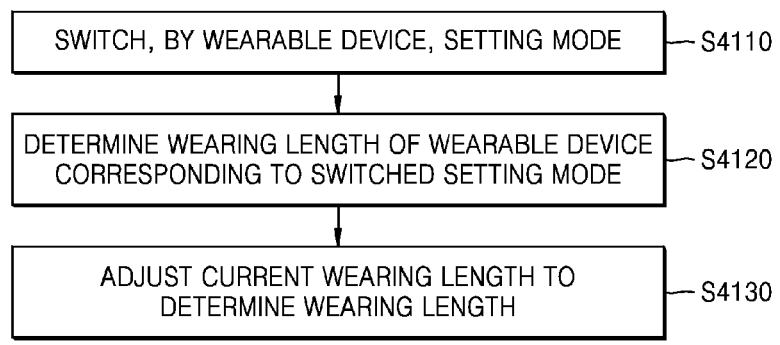

[Fig. 42]
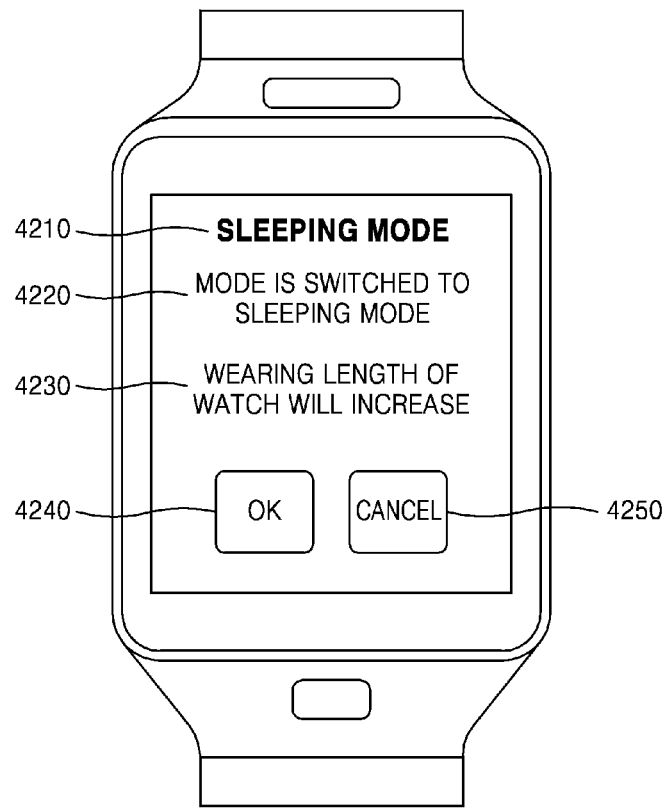
[Fig. 43]
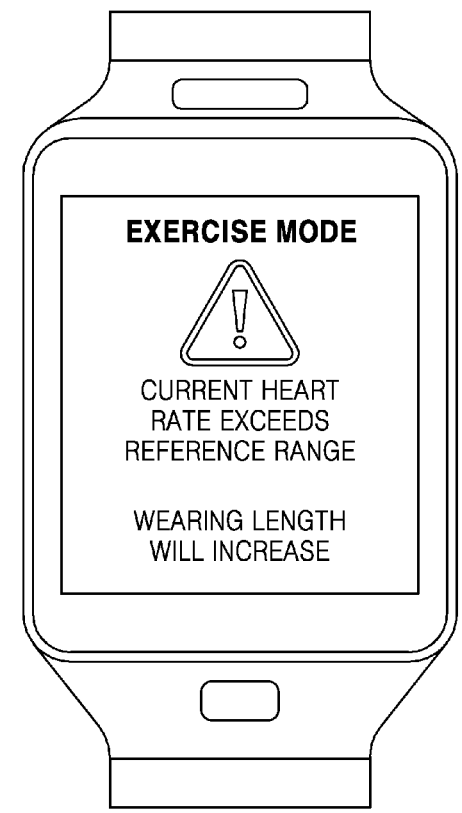

[Fig. 44]
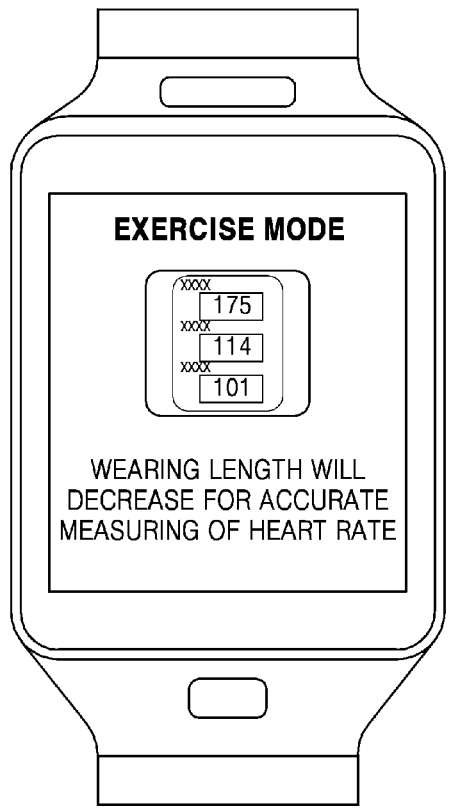
[Fig. 45]
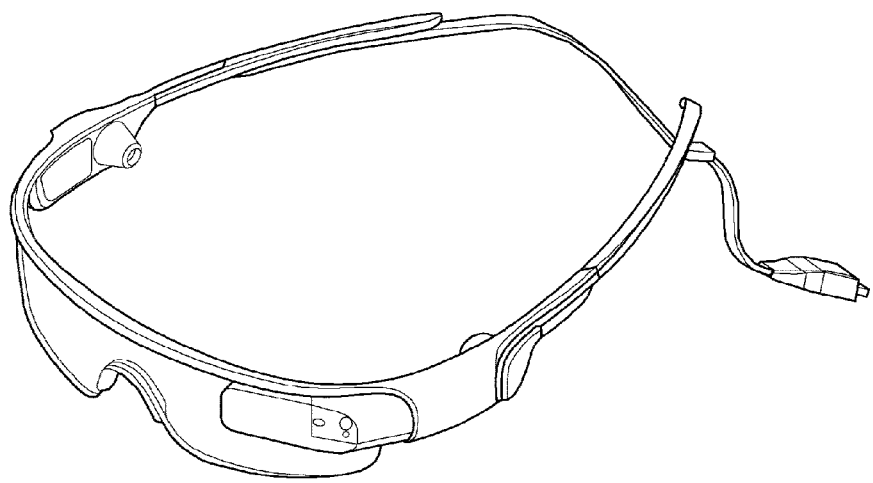

[Fig. 46]
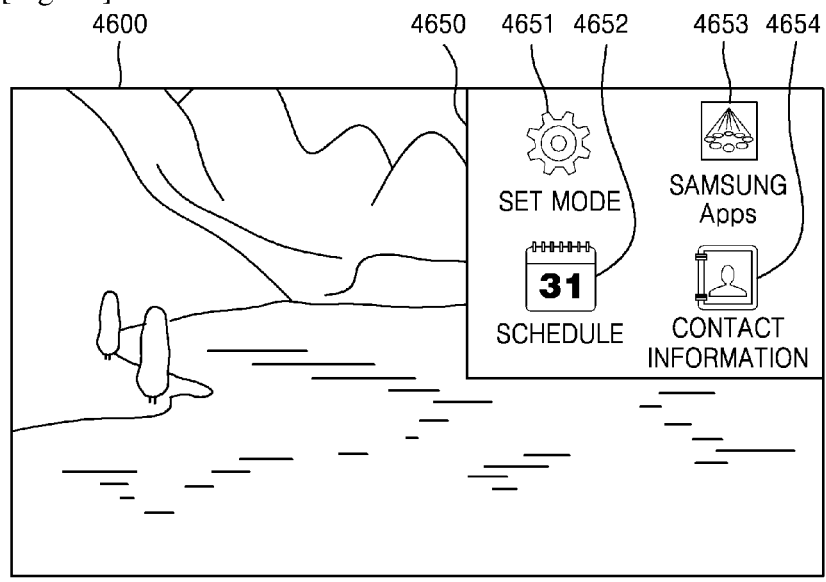
[Fig. 47]
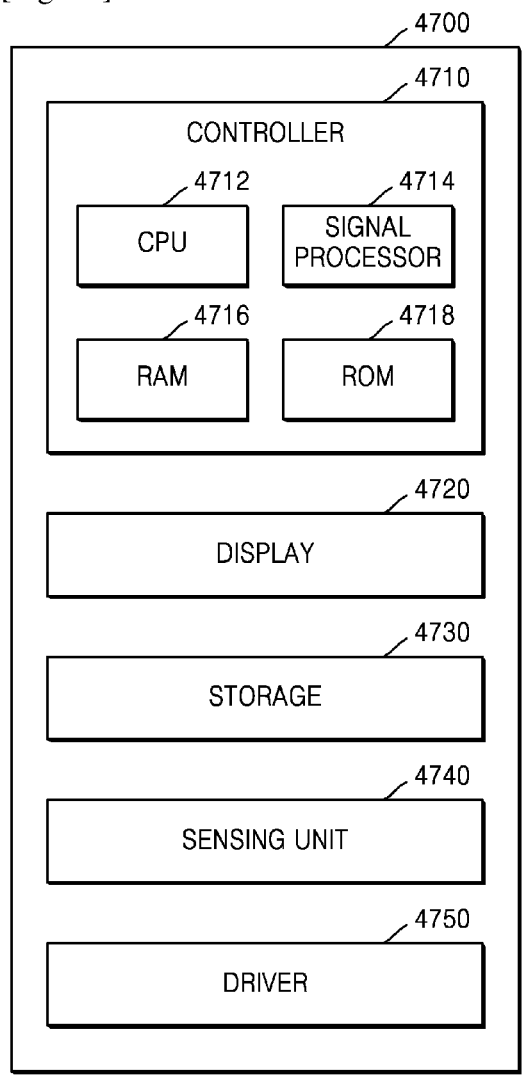

[Fig. 48]
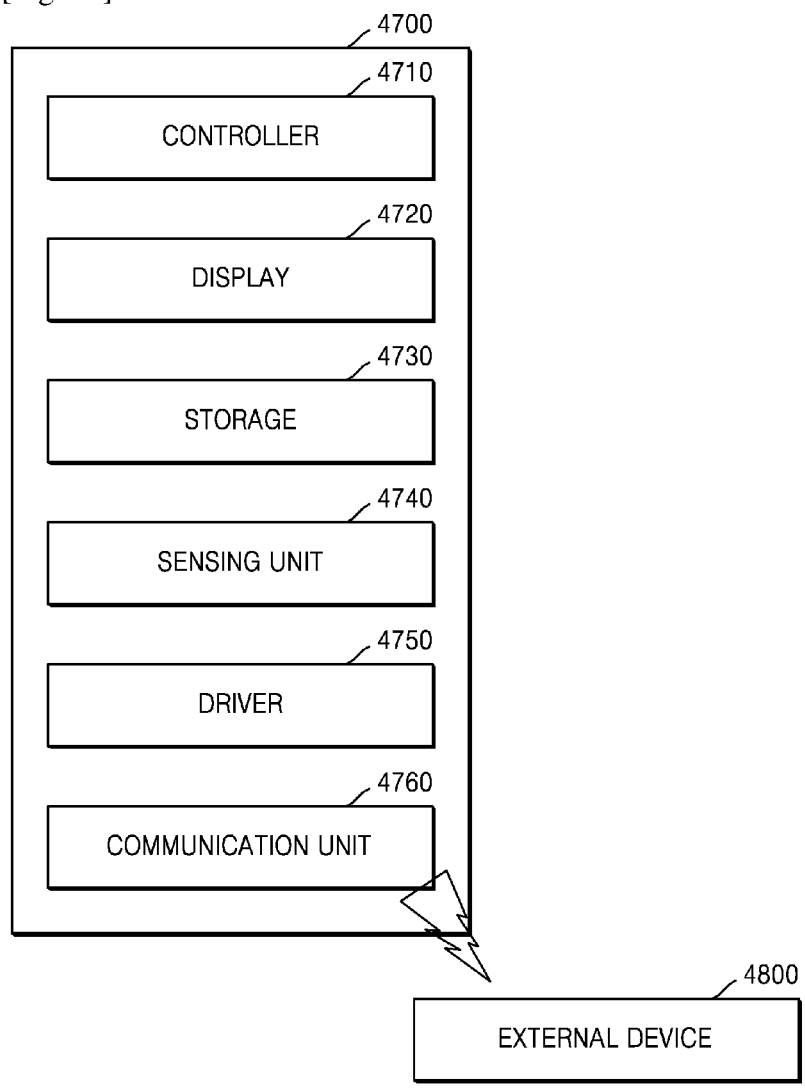

WEARABLE DEVICE AND METHOD OF CONTROLLING THE SAME

This application is a continuation of U.S. Application Ser. No. 15/308,194, filed on Nov. 1, 2016, now U.S. Pat. No. 10,379,877, which is a national stage application of International Patent Application No. PCT/KR2015/006360, filed on Jun. 23, 2015, which designates the United States, and which claims priority to Korean Patent Application No. 10-2014-0053100, filed May 1, 2014 and Korean Patent Application No. 10-2014-0172384, filed Dec. 3, 2014. The contents of each of these applications are incorporated herein in their entirety.

TECHNICAL FIELD

One or more exemplary embodiments relate to a wearable device and a method of controlling the same, and more particularly, to a method of controlling a wearable device to adjust a wearing length thereof.

BACKGROUND ART

As computer systems have been miniaturized and have higher performance and display apparatuses and image communication technologies have advanced, wearable devices that can be worn by a user have been developed. For example, smartwatches wearable on the wrist, smart bands wearable on the head, arm, or foot, smart glass wearable on the head, etc. have been developed.

Such wearable devices each include an electronic module, which provides certain information to a user, and a wearable structure that enables the electronic module to be worn on the user.

DISCLOSURE OF INVENTION

Solution to Problem

One or more exemplary embodiment s include a method of controlling a wearable device to adjust a wearing length thereof. Also, an organic relationship between a wearing length and a setting mode of a wearable device can be efficiently controlled.

Advantageous Effects of Invention

According to the one or more of the above exemplary embodiments of the present inventive concept, an wearable device, which may determine multiple mode according to wearing length, and controlling of the wearable device method may be provided.

BRIEF DESCRIPTION OF DRAWINGS

These and/or other aspects will become apparent and more readily appreciated from the following description of the exemplary embodiments, taken in conjunction with the accompanying drawings in which:

FIGS. 1a and 1b are perspective views of a wearable device according to an exemplary embodiment when seen at different angles;

FIG. 2 is a perspective view of a wearable device according to another exemplary embodiment;

FIGS. 3a and 3b are perspective views of a wearable device seen from different angles when first and second electronic modules of FIG. 1a are mounted on a frame;

FIG. 4 illustrates a state when the wearable device of FIG. 3a is worn on a user;

FIGS. 5a and 5b is a perspective view of a wearable device when a position of a length adjusting module has been changed;

FIG. 6a is a diagram schematically illustrating an example when a length of a length adjusting module of FIG. 1a is adjusted and has an electrical connection;

FIG. 6b is a cross-sectional view illustrating a state when a first fastening unit is detached from a second fastening unit;

FIGS. 7a and 7b schematically illustrate an operation state when the first and second fastening units of FIG. 6a are electrically connected to each other during an assembling process and a length of the length adjusting module is adjusted;

FIG. 8a illustrates an example of a wearable device when the first fastening unit is detached from the second fastening unit;

FIG. 8b illustrates another example of a wearable device when the first fastening unit is detached from the second fastening, unit;

FIG. 9 illustrates an example when the detached first electronic module is worn on a user;

FIG. 10 illustrates an example when a detached first electronic module is worn on a user;

FIG. 11a is a perspective view schematically illustrating an example of a wearable device including a single electronic module;

FIG. 11b is a front view of the wearable device of FIG. 11a;

FIGS. 12 and 13 are flowcharts of a process of registering length information in a wearable device according to an exemplary embodiment;

FIG. 14 illustrates an example of user authentication performed by a wearable device according to an exemplary embodiment;

FIG. 15 is a flowchart of a process of setting length information in a wearable device according to an exemplary embodiment;

FIG. 16 is a diagram illustrating a wallpaper of a wearable device according to an exemplary embodiment;

FIG. 17 is a diagram illustrating a mode setting method performed by a wearable device according to an exemplary embodiment;

FIG. 18 is a diagram illustrating a current wearing length of a wearable device according to an exemplary embodiment;

FIG. 19 is a diagram illustrating a mode-based setting method performed by a wearable device according to an exemplary embodiment;

FIG. 20 is a diagram illustrating setting completion of a normal mode in a wearable device according to an exemplary embodiment;

FIG. 21 is a diagram illustrating, settable modes of a wearable device according to an exemplary embodiment;

FIGS. 22 and 23 are diagrams illustrating an exercise mode setting method performed by a wearable device according to an exemplary embodiment;

FIG. 24 is a diagram illustrating a detailed setting of an exercise mode in a wearable device according to an exemplary embodiment;

FIG. 25 is a diagram illustrating a method of additionally setting a mode other than a completed mode in a wearable device according to an exemplary embodiment;

FIG. 26 is a diagram illustrating a method of guiding a wearing length in a wearable device according to air exemplary embodiment;

FIG. 27 is a diagram illustrating a method of determining a wearing length in a wearable device according to an exemplary embodiment;

FIG. 28 is a diagram illustrating a method of setting a mode for a wearing length in a wearable device according to an exemplary embodiment;

FIGS. 29 and 30 are diagrams illustrating completion of a setting of a sleeping mode in a wearable device according to an exemplary embodiment;

FIG. 31 is a diagram illustrating a detailed setting of a sleeping mode in a wearable device according to an exemplary embodiment;

FIGS. 32 and 33 are flowcharts of a process of switching a mode in a wearable device according to an exemplary embodiment;

FIG. 34 is a diagram illustrating a case when user authentication fails in a wearable device according to an exemplary embodiment;

FIG. 35 is a flowchart of a process of outputting information corresponding to a setting mode in a wearable device according to an exemplary embodiment;

FIG. 36 is a diagram illustrating an example of outputting information corresponding to a setting mode in a Wearable device according to an exemplary embodiment;

FIG. 37 is a flowchart of a process of executing an application corresponding to a setting mode in a wearable device according to an exemplary embodiment;

FIGS. 38 to 40 are diagrams illustrating output information of an application executed by a wearable device according to an exemplary embodiment;

FIG. 41 is a flowchart illustrating a process of adjusting a length of a wearable device according to an exemplary embodiment;

FIGS. 42 to 44 are diagrams illustrating a method of adjusting a length of a wearable device according to an exemplary embodiment;

FIG. 45 is a diagram of a glasses-type wearable device according to an exemplary embodiment;

FIG. 46 is a diagram of a screen displayed by a glasses-type wearable device according to an exemplary embodiment and FIGS. 47 and 48 are block diagrams conceptually illustrating a structure of a wearable device according to an exemplary embodiment.

BEST MODE FOR CARRYING OUT THE INVENTION

Additional aspects will be set forth in part in the description which follows and, in part, will be apparent from the description, or maybe learned by practice of the presented exemplary embodiments.

According to one or more exemplary embodiments, a wearable device includes: first and second electronic modules; a connection module configured to electrically connect the first electronic module to the second electronic module; and a length adjusting module of which length is adjustable to bring the connection module in contact with a user, wherein the length adjusting module includes first and second fastening units that are configured to be assembled and disassembled and also configured, to be locked together in a fastened position when assembled, and when the first and second fastening units are assembled, the first fastening unit is electrically connected to the second fastening unit and a length of the length adjusting module is adjusted.

One of the first and second fastening units may include a plurality of first connectors separated from each other, and other of the first and second fastening units may include at least one second connector electrically contactable with the plurality of first connectors.

When the first and second fastening units are assembled, the length of the length adjusting module may be adjusted by adjusting contact positions between the plurality of first connectors and the at least one second connector.

The connection module may include: a first connection module configured to be electrically connected to the first electronic module; and a second connection module configured to be detached from the first connection module and to be electrically connected to the second electronic module.

The length adjusting module may be positioned between the first connection module and the second connection module.

The length adjusting module may be positioned between the first connection module and the connection module or between the second electronic module and the connection module.

When the first fastening unit and the second fastening unit are disassembled, at least one of the first and second electronic modules may be configured to be independently used.

The wearable device may further include a frame configured to be worn on a user, the first and second electronic module being mounted on the frame.

At least one of the first and second electronic modules may be configured to provide the user with at least one selected from sound information and picture information.

According to one or more exemplary embodiments, a wearable device includes: at least one electronic module; a connection module configured to be electrically connected to the at least one electronic module at ends thereof; and a length adjusting module of which length is adjusted to bring the connection module in contact with a user, wherein the length adjusting module includes first and second fastening units configured to be assembled and disassembled and also configured to be locked together in a fastened position when assemble, and when the first and second fastening units are assembled, the first fastening unit is electrically connected to the second fastening unit and a length of the length adjusting module is adjusted.

According to one or more exemplary embodiments, a wearable structure, which allows at least one electronic module to be worn on a user, includes: a connection module configured to be electrically connected to the at least one electronic module at ends of the connection module; and a length adjusting module of which length is adjusted to bring the Connection module in contact with the user, wherein the length adjusting module includes first and second fastening units configured to be assembled and disassembled and also configured to be locked together in a fastened position when assembled, and when the first and second fastening units are assembled, the first fastening unit is electrically connected to the second fastening unit and a length of the length adjusting module is adjusted.

According to one or more exemplary embodiments, a wearable device includes: an electronic module; a connection module configured to support the electronic module for the electronic module to be worn on a user; and a length adjusting module of which length is adjusted to bring the connection module in contact with the user, wherein the length adjusting module includes first and second fastening units configured to be assembled and disassembled and configured to be locked together in a fastened position when assembled, and when the first and second fastening units are assembled, the first fastening unit is electrically connected to the second fastening unit and a length of the length adjusting module is adjusted.

The electronic module may further include a sensing module configured to sense wearing information of the user.

The sensing module may be further configured to measure a tension of the connection module.

The sensing module may include a pressure sensing module configured to measure a contact pressure between the user and the electronic module.

The sensing module may include a heart rate sensing module configured to measure a heart rate of the user.

The sensing module may include a blood pressure sensing module configured to measure a blood pressure of the user:

The electronic module may include a piezo module configured to convert movement energy of the electronic module into electrical energy.

The electronic module may further include a display configured to display wearing information of the user.

The wearable device may include one selected from a watch, glasses, a ring, a band, and a necklace.

According to one or more exemplary embodiments, a method of controlling a wearable device includes: determining a first wearing length of the wearable device, based on electrical connection information between a first fastening unit and a second fastening unit of the wearable device; and setting information of the determined first wearing length as wearing, length information corresponding to a first mode of a user of the wearable device.

The method may further include: determining a second wearing length of the wearable device; and when it is determined that the determined second wearing length differs from the first wearing length, setting the second wearing length as a wearing length corresponding to a second mode of the user.

The method may further include displaying a mode information list in the wearable device, the mode information list being set based on wearing lengths.

The first mode is set as one selected from a normal mode, a sleeping mode, a child mode, an exercise mode, and a measurement mode.

When the first mode is set as the sleeping mode, a wearing length in the sleeping mode may be longer than a wearing length in the normal mode.

When the first mode is set as the child mode, the exercise mode, or the measurement mode, a wearing length in the child mode, the exercise mode, or the measurement mode may be shorter than a wearing length in the normal mode.

The method may further include identifying the user, based on identification (ID) information of the user.

The ID information of the user may include one or more selected from password information, gesture input information, pattern input information, voice information, and iris information for the We arable device.

The method may further include: displaying information that requests changing of the wearing length from the user; re-determining a wearing length of the wearable device; and updating a current wearing length to the re-determined wearing length as wearing length information corresponding to the first mode of the user of the wearable device.

The re-determined wearing length may differ from the first wearing length.

According to one or more exemplary embodiments, a method of controlling a wearable device, including a module for adjusting a wearing length, includes: determining a wearing length of the wearable device, based on electrical connection information between a first fastening unit and a second fastening unit of the wearable device; and determining a setting mode of the wearable device, based on the determined wearing length.

The method may further include executing, by the wearable device, an application corresponding to the determined setting mode.

The method may further include identifying a user, based on information of the determined wearing length.

The identifying of the user may include determining the user according to whether the determined wearing length information matches a user-based wearing length which is previously set in the wearable device.

The method may further include outputting, by the wearable device, information corresponding to the determined setting mode.

The setting mode of the wearable device may include one or more selected from a normal mode, a sleeping mode, an exercise mode, and a measurement mode.

The method may further include, when it is determined that the determined wearing length information does not match a wearing length which is previously set for the identified user and in the wearable device, performing a setting to block some functions of an application executable by the wearable device.

The some functions may include one or more of functions of letter, call, photograph, and finance applications.

The method may further include, when the determined setting mode is a sleeping mode, performing a setting to terminate a certain function which is being executed by the wearable device.

The certain function may include one or more selected from a position sensing function, an atmospheric pressure sensing function, a temperature sensing function, a Wi-Fi function; and a Bluetooth function.

According to one or more exemplary embodiments, a method of controlling a wearable device, including a module for adjusting a wearing length, includes: switching, by the wearable device, a setting mode; determining a wearing length of the wearable device corresponding to the switched setting mode; and adjusting a current wearing length to the determined wearing length.

The switching of the setting mode may include switching the setting mode when a switching condition of the setting mode which is previously set in the wearable device is satisfied.

The previously set switching condition of the setting mode may correspond to a case of receiving a setting mode switching input from a user of the wearable device.

The previously set switching condition of the setting mode may correspond to a case where a movement of the wearable device for a certain lime is less than a reference movement.

The previously set switching condition of the setting mode may correspond to a case where a movement of the wearable device for a certain time is greater than a reference movement.

The method may further include acquiring, by the wearable device, biometric information of a user, wherein the previously set switching condition of the setting mode may correspond to a case where a value of the acquired biometric information of the user is equal to or greater than a reference value.

The method may further include acquiring, by the wearable device, biometric information of a user, wherein the previously set switching condition of the setting mode may correspond to a case where a value of the acquired biometric information of the user is a value out of a reference range.

The biometric information of the user may include one or more selected from a blood pressure, a heart rate, a temperature, und an amount of excreted sweat.

The setting mode may include one or more modes selected from a normal mode, a sleeping mode, an exercise mode, and a measurement mode.

The wearing length of the wearable device may be set according to a user that uses the wearable device.

Mode for the Invention

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In the drawings, the size of each clement may be exaggerated for clarity and convenience of description. As used herein, the term "and/or" includes any and all combinations of one or more of the associated listed items.

Hereinafter, a wearable device according to an exemplary embodiment a configuration and an operation of a wearable structure applied to the same, and a control method based on length adjustment performed by the wearable device will be described in detail with reference to FIGS. 1 to 46. The terms used herein will be briefly described and the inventive concept will be described in detail.

The terms used to present the inventive concept have been selected from general terms widely used at present, in consideration of the functions of the inventive concept, but may be altered according to the intent of an operator of ordinary skill in the art, conventional practice, or introduction of new technology. Also, if a term is arbitrarily selected by the applicant in a specific case, a meaning of the term will be described in detail in a corresponding description portion of the inventive concept. Therefore, the terms should be defined on the basis of the entire content of this specification instead of a simple name of each of the terms.

In this disclosure below, when it is described that one comprises (or includes or in this disclosure below, when it is described that one comprises (or includes or has) some elements, it should be understood that it may comprise (or include or has) only those elements, or it may comprise (or include or have) other elements as well as those elements if there is no specific limitation. Moreover, each of terms such as ". . . unit", ". . . apparatus" and "module" described in specification denotes an clement for performing at least one function or operation, and may be implemented in hardware, software or the combination of hardware and software.

It will be understood that although the terms "first", "second", etc. may be used herein to describe various components, these components should not be limited by these terms. These components are only used to distinguish one component from another.

Hereinafter, exemplary embodiments will be described in detail to be easily embodied by those of ordinary skill in the art with reference to the accompanying drawings. The inventive concept may, however, be embodied in many different forms and should not be construed as being limited to the embodiments set forth herein. In the accompanying drawings, a portion irrelevant to a description of the inventive concept will be omitted for clarity. Moreover, like reference numerals refer to like elements throughout.

FIGS. 1*a* and 1*b* are perspective views of a wearable device according to an exemplary embodiment when seen at different angles.

Referring to FIGS. 1*a* and 1*b*, the wearable device according to an exemplary embodiment may include a first electronic module 10A, a second electronic module 10B, and a wearable structure which enables the first and second electronic modules 10A and 10B to be worn on a user. The wearable structure may include a connection module 20, which electrically connects the first electronic module 10A to the second electronic module 10B, and a length adjusting module 30 of which length is adjusted to bring the connection module 20 in contact with the user.

At least one of the first and second electronic modules 10A and 10B may be configured to provide information to the user. At least one of the first and second electronic modules 10A and 10B may be a portable mobile device such as a communication terminal, a game machine, a multimedia device, a portable computer, a photographing device, or the like. In addition, if it is possible to provide information to a user, the first and second electronic modules 10A and 10B may be variously modified and implemented.

The information provided to the user may include at least one selected from picture information and voice information. Here, the picture information may include image information or video information.

Each of the first and second electronic modules 10A and 10B may provide the information to the user, or one of the first and second electronic modules 10A and 10B may provide the information to the user.

For example, the first electronic module 10A may provide the information to the user, and the second electronic module 10B may supply power and/or a signal to the first electronic module 10A.

The first, electronic module 10A may include an output unit 10 for providing the information. The output unit 110 may display the picture information.

The second electronic module 10B may include a power supply (not shown) that supplies the power to the first electronic module 10A. The power supply may include a rechargeable battery or a disposable battery. However, a position of the power supply is not limited to the second electronic module 10B, and depending on the case, may be appropriately changed. For example, the power supply may be disposed in the connection module 20. In this case, the power supply may be a wire type battery.

The first and second electronic modules 10A and 10B may have substantially the same weight in consideration of a sense of wearing of a user.

If a module is configured to provide the information to a user, the first and second electronic modules 10A and 10B may be variously modified. For example, as illustrated in FIG. 2, the first and second electronic modules 10A and 10B may respectively include a plurality of output units 110A and 110B (for example, a speaker). that provide sound information to the user. First and second electronic modules 10A1 and 10B1 may provide different pieces of sound information and thus may provide a stereo sound to the user.

In the above-described exemplary embodiment, the first and second electronic modules 10A and 10B have been described as being configured to provide the information to the user, but are not limited thereto. For example, the first and second electronic modules 10A and 10B may receive certain information from the user. For example, at least one of the first and second electronic modules 10A and 10B may include an input unit 130. For example, the input unit 130 may recognize a voice of a user, or may include a sensor for recognizing a user's motion.

FIGS. 3a and 3b are perspective views of a wearable device seen from different angles when the first and second electronic modules 10A and 10B of FIG. 1a are mounted on a frame 40. FIG. 4 illustrates a state wherein the wearable device of FIG. 3a is worn on a user U.

Referring to FIGS. 3a and 3b, the first and second electronic modules 10A and 10B may be detachably coupled to the frame 40. With the first and second electronic modules 10A and 10B are mounted on the frame 40, the user U may wear the frame 40, and thus, as illustrated in FIG. 4, the user U may wear the wearable device.

The first and second electronic modules 10A and 10B may respectively include a plurality of coupling parts 121 and 122 which may be coupled to the frame 40. The first electronic module 10A may be mounted on the frame 40 through the coupling part 121, and the second electronic module 10B may be mounted on the frame 40 through the coupling part 122.

The frame 40 may be configured to be worn on the user U. For example, the frame 40 may be a glasses frame. The glasses frame may include a supporting part 410, which supports an eyeglass G, and a pair of temple parts 420 that enable the supporting part 410 to be worn on the user U. The coupling part 121 of the first electronic module 10A and the coupling part 122 of the second electronic module 10B may be respectively mounted on the pair of temple parts 420. The output unit 110 of the first electronic module 10A may be disposed in front of the eyeglass G. Therefore, the output unit 110 of the first electronic module 10A may be disposed within a viewing range of the user U. When the output unit 110 is not used, the output unit 110 may be rotated to be disposed out of the viewing range of the user U. A rotation angle of the output unit 110 may be equal to or less than about 270 degrees.

In the above-described exemplary embodiment, a structure where the first and second electronic modules 10A and 10B are detachably coupled to the frame 40 has been described as an example, but the present embodiment is not limited thereto. As another example, as illustrated in FIG. 2, the first and second electronic modules 10A and 10B may be implemented to form one body with the frame 40. A plurality of frames, 40A and 40B may have a shape appropriate for a body part of a user, and for example, may have a shape which surrounds a portion of each of a user' cars. The framer 40A may be implemented to form one body with the first electronic module 10A1, and the frame 40B may be implemented as one body with the second electronic module 10B1.

Referring again to FIGS. 3a and 3b, the connection module 20 may electrically connect the first electronic module 10A to the second electronic module 10B. The connection module 20 may be disposed between the first electronic module 10A and the second electronic module 10B. The power or the signal may be transferred between the first electronic module 10A and the second electronic module 10B through the connection module 20. The connection module 20 may include a cable enabling an electrical connection.

The connection module 20 may be configured to be worn on a user. For example, the connection module 20 may be configured to surround a body part of a user. The body parts of different users may differ in size. In order to surround body parts of of different sizes, the connection module 20 may have a sufficient length. However, when the body part is the head, a length of the connection module 20 may be about 10 cm to about 30 cm. When the body part is the wrist, the length of the connection module 20 may be about 5 cm to about 20 cm.

When the power supply, which supplies the power to the first and second electronic modules 10A and 10B, is a wire type battery built into the connection module 20, the connection module 20 may have a sufficient length as described above, and thus, a capacity of a battery of the wearable device increases.

The connection module 20 may include a soft material which can be easily bent by a user.

A length L of the length adjusting module 30 may be adjusted to bring the connection module 20 in contact with or close to the user so that the user can wear it. By adjusting the length L of the length adjusting module 30, the connection module 20 may be brought in contact with the user, and thus, the wearable device provides a good wearing sensation to the user. Also, as the connection module 20 is brought in contact with the user, even when the user moves, the first and second electronic modules 10A and 10B are prevented from being shaken by the user. Accordingly, the first and second electronic modules 10A and 10B provide stable information to the user.

The length adjusting module 30 may be disposed in a center portion of the connection module 20. For example, the length adjusting module 30 may be disposed between a first connection module 201 connected to the first electronic module 10A and a second connection module 202 connected to the second electronic module 10B.

However, a position of the length adjusting module 30 is not limited thereto, and may be variously changed. For example, the length adjusting module 30 may be disposed at an end of the connection module 20. The length adjusting module 30 may be disposed between a connection module 21 and the first electronic module 10A as illustrated in FIG. 5a, or may be disposed between a connection module 22 and the second electronic module 10B as illustrated in FIG. 5b.

The length adjusting module 30 may be adjusted in length and may have an electrical connection between a first fastening unit 310 and a second fastening unit 320 (see FIG. 6a). FIG. 6a is a diagram schematically illustrating an example where, the length adjusting module 30 of FIG. 1a is adjusted in length and has an electrical connection between the first fastening unit 310 and the second fastening unit 320. FIG. 6b is a cross-sectional view illustrating a state where the first and second fastening units 310 and 320 of the length adjusting module 30 of FIG. 6a are detached from each other. FIG. 6a illustrates a state where the first and second fastening units 310 and 320 of the length adjusting module 30 of FIG. 6a are assembled.

Referring to FIGS. 6a and 6b, the length adjusting module 30 may be assembled and disassembled and may include the first and second fastening units 310 and 320 which may be locked together in a fastened position. When the first fastening unit 310 and the Second fastening unit 320 are assembled, the first fastening unit 310 may be electrically connected to the second fastening unit 320 and the length L of the length adjusting module 30 may be adjusted.

One of the first and second fastening units 310 and 320 may include a plurality of first connectors 311a to 311c be separated from each other, and the other one may include at least one second connector 321 which may be electrically connected to the plurality of first connectors 311a to 311c.

For example, the first fastening unit 310 may include the plurality of first connectors 311a to 311c which may be electrically connected to the second connector 321 and are disposed to be separated from each other. In the present embodiment, three first connectors 311a to 311c are illustrated as an example of the plurality of first connectors 311a to 311c, but the present embodiment is not limited thereto. For example, depending on the case, the number of the first connectors may be modified and implemented as two or four or more.

A separation distance "a" between the first connectors 311a to 311 may be changed according to a wearing part of a user and/or the like. For example, when a wearing part of a user is a rear part of the head, the separation distance "a" between the first connectors 311a to 311 may be about 2 mm to about 5 mm. As another example, when a wearing part of a user is the wrist, the separation distance "a" between the first connectors 311a to 311 may be about 1.1 mm to about 1.5 mm. In addition, a wearing part of a user may be variously changed, and thus; the separation distance "a" may be appropriately set. The separation distance "a" may be defined as a distance between adjacent first connectors 311a to 311c.

The first fastening unit 310 may further include a housing 312 that accommodates the plurality of first connectors 311a to 311c. The housing 312 may include at least one opening O into which an end of the second fastening unit 320 may be inserted. For example, a plurality of openings may be respectively provided in both sides of the housing 312.

The first connectors 311a to 311c may be electrically connected to the first electronic module 10A. The first connection module 201 may be disposed between the first connectors 311a to 311c and the first electronic module 10A (see FIG. 1a), and the first connectors 311a to 311c maybe connected to the first electronic module 10A through the first connection module 201. However, an electrical connection between the first connectors 311a to 311c and the first electronic module 10A is not limited thereto. For example, the first connectors 311a to 311c may be directly connected to the first electronic module 10A without the first connection module 201.

The second fastening unit 320 may include at least one second connector 321. The second connector 321 may be electrically connected to the second electronic module 10B. The second connection module 202 may be disposed between the second connector 321 and the second electronic module 10B, and the second connector 321 may be electrically connected to the second electronic module 10B through the second connection module 202. However, an electrical connection between the second connector 321 and the second electronic module 10B is not limited thereto. For example, the second connector 321 may be directly connected to the second electronic module 10B without the second connection module 202.

The second fastening unit 320 may include an elastic member 322 that pressurizes. the second connector 321 toward the first connectors 311a to 311c. The elastic member 322 may transmit an elastic bias force to the second connector 321 in a direction facing the first connectors 311a to 311c.

By adjusting, contact positions between the second connector 321 and the plurality of first connectors 311a to 311c separated from each other, the length of the length adjusting module 30 may be adjusted, and the first connectors 311a to 311c may be electrically connected to the second connector 321. Therefore, the first electronic module 10A electrically connected to the first connectors 311a to 311c may be electrically connected to the second electronic module 10B electrically connected to the second connector 321.

The first connectors 311a to, 311c may be female-male coupled to the second connector 321. To this end, the first connectors 311a to 311c and the second connector 321 may have shapes corresponding to each other. For example, each of the first connectors 311a to 311c may be a female connector; and the second connector 321 may be a male connector. Each of the first connectors 311a to 311c may have a concave semicircular shape, and the second connector 321 may have a convex semi-circular shape to correspond to the concave semicircular shape. However, the shapes of the first connectors 311a to 311c and the second connector 321 are not limited thereto, and if the first connectors 311a to 311c are able to be coupled to the second connector 321, the shapes may be variously modified.

In the above-described embodiment, an example where the first connectors 311a to 311c are included in the first fastening unit 310 and the second connector 321 is included in the second fastening unit 320 has been described, but the present embodiment is not limited thereto. For example, depending on the case, the first connectors 311a to 311c may be included in the second fastening unit 320, and the second connector 321 may be included in the first fastening unit 310.

FIGS. 7a and 7b schematically illustrate an operation state where the first and second fastening units 310 and 320 of FIG. 6a are electrically connected to each other in a process of being assembled, and the length of the length adjusting module 30 is adjusted.

Referring to FIG. 7a, an end of the second fastening unit 320 may be inserted into the opening O of the housing 312. Therefore, the second connector 321 of second fastening unit 320 may be inserted into an opening O of the first fastening unit 310. The inserted second connector 321 may be coupled to the first connector 311c of the first fastening unit 310. Thus, the first connector 311c may be electrically connected to the second connector 321. In this case, the length adjusting module 30 may have a certain length L1.

In this state, a user may pressurize the second fastening unit 320 in a direction (an A1 direction) intersecting a direction of the elastic bias provided by the elastic member 322. Therefore, the second connector 321 may be repeatedly disassembled froth or assembled with the plurality of first connectors 311a to 311c and thus may be moved in position. The user may release pressure, applied in the A1 direction, at a desired position and thus may finish an assembly of the first fastening unit 310 and the second fastening unit 320.

Therefore, as illustrated in FIG. 7b, the first connector 311a may be coupled to the second connector 321. The first connector 311a may be electrically connected to the second connector 321. Contact of the first connector 311a of the first fastening unit 310 with the second connector 321 of the second fastening unit 320 may be maintained by an elastic force of the elastic member 322. In this case, the length adjusting module 30 may have a length L2 which is shorter than the length L1.

Through the above-described process, the first fastening unit 310 may be electrically connected to the second fastening unit 320, and the length L of the length adjusting module 30 may be reduced. On the other hand, in a state illustrated in FIG. 7b, the user may apply pressure in a direction (an A2 direction) opposite to the pressurization direction, and thus, as illustrated in FIG. 7a, the first fastening unit 310 may be electrically connected to the second fastening unit 320, and the length L of the length adjusting module 30 may increase.

Referring again to FIG. 6b, the first fastening unit 310 may be detached from the second fastening unit 320. Therefore, the first electronic module 10A connected to the first fastening unit 310 may be detached from the second electronic module 10B connected to the second fastening unit 320.

FIG. 8a illustrates an example of the wearable device where the first fastening unit 310 is detached from the second fastening unit 320. FIG. 8b illustrates another example of the wearable device where the first fastening unit 310 is detached from the second fastening unit 320. Referring to FIGS. 8a and 8b, since the first electronic module 10A is detached from the second electronic module 10B, a user easily carries the wearable device when the wearable device is unused.

Moreover, since the first electronic module 10A is detached from the second electronic module 10B, the user may independently use one of the first and second electronic modules 10A and 10B depending on usability. For example, as illustrated in FIG. 9, a user U may use only the first electronic module 10A. Therefore, the user U may identify picture information through the first electronic module 10A with one eye E1 and look at its periphery with the other eye E2. As another example, as illustrated in FIG. 10, a user U may use only a first electronic module 10A1. Therefore, the user U may hear voice information through the first electronic module 10A1 with one ear and hear a peripheral sound with the other ear. As described above, by, using one electronic module 10A, the user U may be provided with information while looking at a peripheral situation.

In the above-described embodiments, an example where the plurality of electronic modules 10A and 10B are provided has been described above. However, the wearable device according to an exemplary embodiment and the wearable structure applied to the same are not limited thereto; and a single electronic module may be applied.

FIG. 11a is a perspective view schematically illustrating an example of a wearable device using a single electronic module 10. FIG. 11b is a front view of the wearable device of FIG. 11a.

Referring to FIGS. 11a and 11b, the wearable device may include one electronic module 10 and a wearable structure which enables the electronic module 10 to be worn on a user. The wearable structure may include a connection module 20, which includes both ends 201a and 202a electrically connected to the electronic module 10, and a length adjusting module 30 which is adjusted in length in order for the connection module 20 to be closely adhered to the user. In the present embodiment, differences with the above-described embodiments will be described, and descriptions on the same or similar details are not repeated.

The electronic module 10 may be configured to provide information to a user or receive information from the user. For example, the electronic module 10 may provide picture information and voice information to the user. The picture image may include various pieces of information such time, date, etc. Also, the electronic module 10 may receive certain information (for example, parameters such as a blood pressure; blood sugar, and/or the like of the user) from the user. In this case, the electronic module 10 may include a sensor for collecting information.

The connection module 20 may electrically connect both ends of the electronic module 10. One end 201a of the connection module 20 may be connected to one end of the electronic module 10, and the other end 201b may be connected to the other end of the electronic module 10. The electronic module 10 may form a closed loop through the connection module 20.

The length adjusting module 30 may be adjusted in length and may have an electrical connection as in the above-described embodiments. Therefore, the length adjusting module 30 may be adjusted in length in order for the connection module 20 to be closely adhered to a wrist of a user. Also, the length adjusting module 30 may include first and second fastening units 310 and 320 (see FIG. 6a) which may be disassembled and assembled. Since the first and second fastening units 310 and 320 are disassembled, a first connection module 201 and a second connection module, 202 may be disassembled when the wearable device is unused.

In describing FIGS. 6 and 7, for convenience of a description, an example where a user directly pressurizes the wearable structure has been described above. In the wearable structure described in the present disclosure, a connection between the first fastening unit 310 and the second fastening unit 320 may not be made by only pressure applied by a user.

In the wearable structure described in the present disclosure, the length adjusting module 30 may be physically driven and adjusted in length, based on an electrical signal. The wearable structure may include a structure for physically pressurizing the first fastening unit 310 and/or the second fastening unit 320. Therefore, when an electrical signal for adjusting a length is received from the electronic module 10, the length adjusting module 30 may change a connection of the first and second fastening units 310 and 320 to a contact with another connector which is disposed to be separated from the first and second fastening units 310 and 320.

When the electrical signal for adjusting a length is received from the electronic module 10, the length adjusting module 30 may change, a current length to a length corresponding to the electrical signal. For example, the first connector 311a of the first fastening unit 310 may electrically contact the second connector 321 of the second fastening unit 320, and when an electrical signal for adjusting a current length to a length between the first connector 311a of the first fastening unit 310 and the second connector 321 of the second fastening unit 320 is received, a length may be adjusted by applying physical pressure corresponding to the electrical signal.

A method of applying physical pressure of the length adjusting module 30 may be variously implemented. A driving module such as a motor or the like may apply pressure to the first and second fastening units 310 and 320, or the method may be a method using an attracting force and a repulsing force based on an electromagnetic force.

The wearable device and the wearable structure applied to the same have been described above. Hereinafter, a method of controlling a wearable structure, of which a length may be adjusted, in a wearable device will be described.

In a wearable device, various lengths may be provided by adjusting a length of a length adjusting module. Depending on the case, a user may wear the wearable device in various lengths. For example, when the user is exercising, a shorter length than a wearing length of a normal case may be maintained for bringing the wearable device in closer contact with a body of the user. On the other hand, when the user is sleeping, a longer length than the wearing length of the normal case may be maintained for applying low pressure to a body part on which the wearable device is worn. In addition to a case where the user exercises or sleeps, if biometric information is capable of being measured by the wearable device, a wearing length may be accurately measured by bringing the wearable device in closer contact with a body part on which the wearable device is worn.

Therefore, a method which is suitable for a wearable device, having various modes based on a change in a wearing length of the wearable device, for each mode will be described below in detail.

Mode Registration Method (Initial Registration)

FIG. 12 is a flowchart illustrating a process of registering length information in a wearable device according to an exemplary embodiment.

In operation S1210, the wearable device may determine a first wearing length of the wearable device, based on electrical contact information between the first fastening unit 310 and the second fastening unit 320. As described above, the length L of the length adjusting module 30 may have various lengths (for example, L1 of FIGS. 7a and L2 of FIG. 7b) due to the plurality of first connectors 311a to 311c which are disposed to be separated from each other.

In operation S1220, the wearable device may set information of the determined first wearing length as wearing length information corresponding to a first mode of a user of the wearable device. The wearable device may set a wearing length, selected by the user, to a certain mode and then, when a wearing length is determined as the selected wearing, length, the wearable device may switch a current mode to the certain mode.

FIG. 13 is a flowchart illustrating a process of registering length information in a wearable device according to, an exemplary embodiment.

As described above with reference to FIG. 12, in operation S1310, the wearable device may determine a first wearing length of the wearable device, based on electrical contact information between the first fastening unit 310 and the second fastening unit 320.

In operation S1320, the wearable device may identify a user, based on user identification (ID) information. The user ID information may be ID information of only a corresponding user and may include various pieces of information such as pattern information, password information, gesture information, voice information, iris information, fingerprint information, face information, etc. That is, the user ID information may be information which enables a user to be identified. The reason that identifies a user is for switching a mode to a setting mode for each wearing length suitable for a user because wearing lengths of users differ. Furthermore, security is reinforced by authenticating a user. The present operation may be construed as a security operation of authenticating a user, or may be construed as an operation of providing accurate information depending on users. For example, when one user uses the wearable device, the present operation is an operation which is added for security, and protects various pieces of information of the user.

When there are two or more users of the wearable device, the users may have, a difference in operation of reinforcing security, and moreover, since wearing lengths of the users differ, the users may have a difference in setting a mode. For example, when two users which are an adult and a child uses the same smartwatch, the adult and the child may have a difference in circumference length of a wrist which is a body part on which the smartwatch is worn. Therefore, since each tiger has its unique wearing length, a mode may be set to match user ID information.

In operation S1330, the wearable device may set the determined first wearing length information as the wearing length information corresponding to the first mode of the user of the wearable device. When the first wearing length determined by the wearable device is L1, a length "L1" may be set to one selected from a normal mode, a sleeping mode, a child mode, an exercise mode, and a measurement mode.

The normal mode may denote a default mode for the wearable device. The normal mode may denote a mode where there is no special setting, and denote a case where there is no special limitation or release of an application executed by the wearable device.

The sleeping mode may denote a case where the user does not manipulate the wearable device for a certain time or more. The sleeping mode may not denote a case where the user does not just simply manipulate the wearable device for a certain time or more, and some functions of the wearable device may be limited in the sleeping mode. For example, in the sleeping mode, a display may be set to an inactive state. Functions such as a call function, Wi-FI, and Bluetooth may be limited. On the other hand, in the sleeping mode, there may be a function which is additionally performed. When a mode is switched to the sleeping mode, a measurement application for measuring a sleeping pattern of a user may be executed, or an alarm function may be executed.

The child mode may denote a case where some functions of the wearable device is limited. When the wearable device is manipulated by a user like a child, execution of applications associated with call, message, gallery, and finance may be limited.

The exercise mode may denote a case where, a user of the wearable device has an active motion, and denote a case where the wearable device is moved in a three-dimensional (3D) space. When a mode is switched to the exercise mode, the wearable device may execute certain function. For example, the wearable device may execute an application which measures a heart rate of a user, or execute a stopwatch function. Alternatively, the wearable device may drive a piezo sensor that converts a movement of the wearable device into electrical energy.

The measurement mode may denote a mode which measures biometric information of a user. The measurement mode may denote a mode which measures one or more selected from heart rate (or pulse), blood pressure, brainwave, sweat, and body temperature information of the per. The biometric information of the user may be measured by using various sensors built into the wearable device, and moreover, a state of the user may be analyzed based on a video or an image where the user is a subject. The wearable device may autonomously analyze measured information to provide relevant information to the user, or may acquire relevant information in communication with an external device and supply the acquired information to the user.

The wearable device may register wearing length information of a user by matching each of the various modes with the wearing length information, and a user-based setting mode and user-based wearing length information may be stored in a storage of the wearable device in a database (DB) form.

FIG. 14 illustrates an example of user authentication performed by a wearable device according to an exemplary embodiment.

In regard to a user-based wearing length and a user-based mode setting described above with reference to FIG. 13, the wearable device may display a user authentication operation in a display. As illustrated in FIG. 14, user authentication may be performed in various schemes such as pattern input, password input, gesture input, voice input, iris recognition, fingerprint recognition, face recognition, etc.

The reason that the wearable device identifies a user is because users have a difference in environment suitable for the use of the wearable device. For example, even in the same sleeping mode, an A user may desire to measure a sleeping pattern, but a B user may not desire to perform any function. In this case, when a wearing length of the A user is the same as that of the B user, it is difficult for the wearable device to identify a user, and thus, the wearable device may provide an environment suitable for the user through an additional operation of identifying the user.

In FIG. 14, a smartwatch is illustrated as an example, but an exemplary embodiment of the present disclosure is not limited to the smartwatch. For example, various wearable devices capable of being worn on a user may be applied. The wearable device may be broadly construed as devices having various forms such as a band form worn on a head, an arm, or a foot of a user, a glasses form which is mountable like glasses, a watch form, worn a wrist, a ring form worn on a finger, and an earphone form worn on ears. In the following drawings, for convenience of a description, a smartwatch will be described as an example of a wearable device.

FIG. 15 is a flowchart illustrating a process of setting length information in a wearable device according to an exemplary embodiment.

The wearable device may have various modes as described above, a wearing length may be differently set for each of the various modes. Hereinafter, a plurality of mode settings based on a wearing length will be described.

In operation S1510, a first wearing length of the wearable device may be determined based on electrical contact information between the first fastening unit 310 and the second fastening unit 320 of the wearable device.

In operation S1520, the wearable device may set information of the determined first wearing length as wearing length information corresponding to a first mode of a user of the wearable device.

In operation S1530, the wearable device may change a wearing length according to manipulation of the length adjusting module 30 of the wearable device by the user. The wearable device may determine a second wearing length of the wearable device, based on electrical contact information between the first fastening unit 310 and the second fastening unit 320.

In operation S1540, the wearable device may compare the determined first wearing length with the determined second wearing length to determine whether the first wearing length is the same as the second wearing length.

In operation S1550, when it is determined that the first wearing length differs from the second wearing length, the wearable device may set information of the determined second wearing length as wearing length information corresponding to a second mode of the user of the wearable device. For example, a wearing length of 18 cm may be set to the normal mode, and, then, when a wearing length is determined as 17.5 cm, the wearable device may set the wearing length to the exercise mode.

The first mode and the second mode may be the same modes. For example, when the user wears the wearable device, the wearable device may set each of a wearing length of 18 cm and a wearing length of 18 cm to the normal mode.

When it is determined that the first wearing length is the same as the second wearing, length, the determined second wearing length may be set to be repetitive of the previously set first mode, and thus, in order to avoid this, the wearable device may perform display in order for the user to adjust a wearing length to another wearing length.

FIG. 16 is a diagram illustrating one screen Of a wearable device according to an exemplary embodiment.

As illustrated in FIG. 16, a display 1600 of the wearable device, may display one screen. An icon image for enabling a mode of a user to be set may be displayed on the screen. In addition to an icon "mode setting 1610", various icons 1620, 1630 and 1640 may be displayed together.

An icon "mode setting" may be displayed along with an environment setting mode of the wearable device and may correspond to a mode which a mode of the wearable device may be set, in addition to a mode setting based on a wearing length.

FIG. 17 is a diagram illustrating a mode setting method performed by a wearable device according to an exemplary embodiment.

The wearable device may display information that guides a user to wear the wearable device. As illustrated in FIG. 17, a current state of the wearable device may be displayed to show that a mode setting 1710 is being performed. Also, the wearable device may display an image 1720 that guides the user to wear the wearable device. In this context, the wearable device may display text information 1730 like "wear in desired length". Information that guides the user to wear the wearable device on a body part may be displayed in various forms such vibration, sound, and/or the like, in addition to the above-described image.

FIG. 18 is a diagram illustrating a current wearing length in a wearable device according to an exemplary embodiment.

As illustrated in FIG. 18, the wearable device may determine and display a current wearing length. The length adjusting module 30 of the wearable device may determine a wearing length of the wearable device based on electrical contact information between the first fastening unit 310 and the second fastening unit 320 and may display the determined wearing length in order for a user to know the wearing length. The wearable device may just simply display only wearing length information 1830 like "a current wearing length is 18 cm". In addition, the wearable device may sense a contact pressure 1840 between a body of the user and the wearable device and display the wearing length information along with the contact pressure. The wearable device may analyze contact pressure information, and when the contact pressure is determined as pressure within a normal range, the Wearable device may display the contact pressure information along with contact pressure state information 1850 such as "normal". When the sensed contact pressure is out of a predetermined range, the wearable device may display information such as "wear loosely" or "wear to more tighten".

In the present disclosure, a watch is described as an example, and a wearing length is divided at an interval of 0.5 cm within 17 cm to 19 cm. However, the present. disclosure is not limited thereto. Various separation distances (1 mm to 1 cm) may be provided depending on the kind of a watch, and a length adjusting module including various separation distances may be applied to another kind of wearable device. That is, an adjustable separation distance in a length adjusting module, of a hairband type wearable device may differ from an adjustable separation distance in a length adjusting module of a glasses type wearable device.

Moreover, in the present disclosure, each of separation distances that is constant has. been described as an example, but separation distances may be differently provided without being unified, based on an internal structure of a length adjusting module. For example, in a watch, a plurality of compartments, may be provided in a watch chain and may have respective separation distances.

FIG. 19 is a diagram illustrating a mode-based setting method performed by a wearable device according to an exemplary embodiment.

The wearable device may determine a determined wearing length as a wearing length corresponding to a certain mode of the wearable device. As illustrated in FIG. 19, the wearable device may display currently determined wearing length information 1920. When any mode is not set in the wearable device, the wearable device may display information 1930 which causes a mode to be set to the normal mode. In addition, the wearable device may display information 1940 which causes a mode to be set to another mode such as the sleeping mode, the child mode, the exercise mode, the measurement mode, or the like.

When a selection input which causes a mode to be set to a certain mode is received from the user, the wearable device may store the determined wearing length information in a storage by matching the determined wearing length information with a selected certain mode. In this case, the storage may store user, wearing length; and mode information in a DB form.

FIG. 20 is a diagram illustrating completion of a setting of the normal mode in a wearable device according to an exemplary embodiment.

When a wearing length is set to a certain mode, according to a selection of a user, the wearable device may display completion of a setting to enable the user to check a set mode. At this time, the wearable device may further perform a recheck procedure that displays information 2040 for rechecking a completed mode setting or information 2050 for cancelling the completed mode setting and enables the user to recheck a selection of the user. When a check input or a cancelation input is not received from the user for a certain time, the wearable device may terminate a check procedure and may operate in a completed mode.

FIG. 21 is a diagram illustrating settable modes in a wearable device according to an exemplary embodiment.

A user may set a plurality of modes in the wearable device. In addition to a setting of the normal mode in FIGS. 17 to 20, another mode may be set. Such a process has been described above with reference to FIG. 15, and thus, an example applied to the present embodiment will be described with reference to FIG. 21.

A user may desire to switch a mode to a certain mode for a length where the user wears the wearable device, and the wearable device may differently set a mode, based on a wearing, length. As described above as an example, a setting of the normal mode may be completed for a wearing length of 18 cm, and then, the user may additionally set another mode. When it is determined that a wearable length of the wearable device worn on the, user is 17.5 cm, the wearable device may display pieces of information 2130, 2140, 2150 and 2160 about modes selectable by the user, in addition to currently determined wearing length information 2120. In the drawing, the sleeping mode, the measurement mode, the exercise mode, and the child mode have been described as an example, but the present embodiment is not limited to the modes. Various modes may be set by the user.

FIGS. 22 and 23 are diagrams illustrating an exercise mode setting method performed by a wearable device according to an exemplary embodiment.

As in FIG. 20, the wearable device may display currently determined wearing length information 2220 and setting-completed mode information 2230. Also, the wearable device may further perform a recheck procedure that displays information 2240 for rechecking a completed mode setting or information 2250 for cancelling the completed mode setting and enables a user to recheck a selection of the user.

Alternatively, as illustrated in FIG. 23, the wearable device may display information 2340, which causes details of a completed setting mode to be set, to guide the user to set the details.

FIG. 24 is a diagram illustrating a detailed setting of the exercise mode in a wearable device according to an exemplary embodiment.

When an input of a detailed setting request for a certain mode is received from a user, the wearable device may display an application which is available in the certain mode or control information about the wearable device. As illustrated in FIG. 24, when a detailed setting input for the exercise mode is received from the user, the wearable device may display an application which is available in the exercise mode or the control information about the wearable device.

For example, an application which is available in the exercise mode may be a stopwatch application. When the wearable device is worn on the user in a wearing length corresponding to the exercise mode, the wearable device may automatically execute a stopwatch function. In addition to the stopwatch application, the wearable device may execute a pedometer application, or execute a music reproduction application.

Moreover, entering Of a power saving mode for reducing power consumption of the wearable device may be set in the exercise mode. Although not shown, the turn-on of a light emitting diode (LED) may be set in the exercise mode, and the wearable device may drive the piezo sensor to cause kinetic energy of the user to be converted into electrical energy.

The controls of the above-described applications or devices are listed for convenience of a description, and the present embodiment is not limited to the above-described applications. It is easily understood by one of ordinary skill in the art that control settings of various, applications or devices, are made by a user.

FIGS. 25 to 31 are diagrams illustrating a method of additionally setting a mode other than a completed mode in a wearable device according to an exemplary embodiment.

In setting the exercise mode, as described above, a user may set switching from a current mode to a certain mode for a certain wearing length in the wearable device.

In FIGS. 25 to 31, the sleeping mode which is set in a case where a wearing length is longer than that in the normal mode is described unlike that a wearing length is shorter than that in the normal mode in FIGS. 21 to 24, and the above-described description on the setting of the exercise mode is applied to FIGS. 25 to 31.

In FIG. 31, a method of receiving a setting input from a user for a detailed setting of the sleeping mode is illustrated. In the sleeping mode, a setting may be made to reduce power consumption by terminating various sensors such as a global positioning system (GPS) sensor, a temperature and humidity sensor, and/or the like, and a setting may be made to reduce consumption power even when a communication function such as Wi-Fi, Bluetooth, or the like is set to an inactive state. Alternatively, a setting may be made to reduce volume and/or screen brightness. The above-described power saving methods may be unified and may be set to one power saving mode, or may be separately set. When a user is sleeping, a setting may be made to execute an alarm application or reproduce a music application for only a certain time.

Mode Switching Method

FIGS. 32 and 33 are flowcharts illustrating a process of switching a mode in a wearable device according to an exemplary embodiment.

The mode registration process based on a wearing length has been described above. Hereinafter, a process where the wearable device switches a mode after a setting is finished will be described.

In operation S3210, the wearable device may determine a wearing length, based on electrical contact information between the first fastening unit 310 and the second fastening unit 320.

In operation S3220, the wearable device may determine a setting mode of the wearable device, based on the determined wearing length. As shown in the following Table 1, a mode setting based on a wearing length may be previously made in the wearable device, based on a setting by a user.

TABLE 1

| wearing length | setting mode |
| --- | --- |
| 17.0 cm | measurement mode |
| 17.5 cm | exercise mode |
| 18.0 cm | normal mode |
| 18.5 cn | sleeping mode |

The wearable device may determine a setting mode corresponding to a currently determined wearing length, based on setting mode information based on wearing lengths which are stored in the storage as shown in Table 1.

For example, the wearable device is executing the normal mode because a mearing length is determined as 18 cm, but when a wearing length is newly determined as 17.5 cm, the wearable device may switch the normal mode to the exercise mode. The wearable device may execute the pedometer application or the music reproduction application, in addition to the stopwatch application.

The wearable device may display mode switching information in the display. The wearable device may allow a user to check whether a mode is switched to a desired mode, and thus enable the user to determine whether to maintain a switched mode.

As illustrated in FIG. 33, the wearable device may additionally perform an operation of identifying a user in switching a mode and thus perform user-based mode switching.

In operation S3310, the wearable device may determine a wearing length, based on electrical contact information between the first fastening unit 310 and the second fastening unit 320.

In operation S3320, the wearable device may identify a user, based on user ID information. The user ID information may be ID information of only a corresponding user and may include various pieces of information such as pattern information, password information, gesture information, voice information, iris information, fingerprint information, face information, etc. That is, the user ID information may be information which enables a user to be identified. The reason that identifies a user is for switching a mode to a setting mode for each wearing length suitable for a user because wearing lengths of users differ. Furthermore, security is reinforced by authenticating a user. The storage of the wearable device may store user-based information as shown in the following Table 2.

TABLE 2

| | wearing length | setting mode |
| --- | --- | --- |
| A user | 17.0 cm | measurement mode |
| | 17.5 cm | exercise mode |
| | 18.0 cm | normal mode |

TABLE 2-continued

| | wearing length | setting mode |
| --- | --- | --- |
| | 18.5 cm | sleeping mode |
| B user | 16.5 cm | measurement mode |
| | 17.0 cm | exercise mode |
| | 17.5 cm | normal mode |
| | 18.0 cm | sleeping mode |

As shown in Table 2, a setting may be differently made for each user. When a wearing length is 17.5 cm, the exercise mode may be set for the A user, and the normal mode may be set for the B user. Therefore, when a process of identifying a user is not performed, a mode is switched to the same mode for a plurality of users.

In operation S3330, the wearable device may determine whether a wearing length is a wearing length corresponding to an identified user. For example, two modes may be set for a user, and in detail, a mode may be the normal mode when mode setting information is 18 cm, or may be the exercise mode when the mode setting information is 17.5 cm. In this case, the wearable device may determine a wearing length of 18.5 cm, based on the electrical contact information between the first fastening unit 310 and the second fastening unit 320.

In operation S3340, when it is determined that a wearing length is not a wearing length for the identified user; the wearable device may block some functions of an application. Therefore, security is reinforced. For example, since the wearing length 18.5 cm determined by the wearable device is not set to any mode for the identified user, the wearable device may block execution of applications associated with call, message, gallery, and finance.

In operation S3350, when a mode corresponding to the wearing length previously set for the identified user, the wearable device may switch the mode to a corresponding mode.

FIG. 34 is a diagram illustrating a case where user authentication fails in a wearable device according to an exemplary embodiment.

As illustrated in FIG. 34, when user ID information does not match wearing length information, the wearable device may determine that identifying of a user fails. Therefore, the wearable device may display information of applications incapable of being executed, thereby enabling a user to check a limited function. When additional user authentication 18 not performed by the user, a blocked application may be set to be executed.

FIG. 35 is a flow chart illustrating a process of outputting information corresponding to a setting mode in a wearable device according top exemplary embodiment.

In operation S3510, the wearable device may determine a wearing length, based on electrical contact information between the first fastening unit 310 and the second fastening unit 320.

In operation S3520, the wearable device may determine a setting mode of the wearable device, based on the determined wearing length.

In operation S3530, the wearable device may output information corresponding to the determined setting mode. The wearable device may display information about the mode, determined based on a setting by the user, in the display, thereby guiding the user to determine a current execution state of the wearable device.

FIG. 36 is a diagram illustrating an example of outputting information corresponding to a setting mode in a wearable device according to an exemplary embodiment.

As illustrated in FIG. 36, the wearable device may display currently switched mode information 3610, wearing length information 3620, and relevant image 3630 information. The wearable device may display unique information of a mode as a sound or a vibration pattern in addition to an image. Also, the wearable device may display setting information 3640, cancelation information 3650, etc. to enable a user to correct mode switching.

FIG. 37 is a flowchart illustrating a process of executing an application corresponding to a setting mode in a wearable device according to an exemplary embodiment.

In operation S3710, the wearable device may determine a wearing length, based on electrical contact information between the first fastening unit 310 and the second fastening unit 320.

In operation S3720, the wearable device may determine a setting mode of the wearable device, based on the determined wearing length.

In operation S3730, the wearable device may execute an application corresponding to the determined setting mode. The wearable device may automatically or manually execute the application, based on predetermined application execution information.

FIGS. 38 to 40 are diagrams illustrating output information of application executed by a wearable device according to an exemplary embodiment.

As illustrated in FIG. 38, the wearable device may display currently switched mode information 3810, wearing length information 3820, and execution application 3830 information. When the music reproduction application is set to be automatically executed by a user in switching a mode to the exercise mode, the wearable device may display content, which are to be automatically executed, as a text, an image, a sound, or a vibration pattern. Also, the wearable device may display setting information 3840, cancelation information 3850, etc. to enable the user to change or cancel automatic execution for mode switching.

As illustrated in FIG. 39, the wearable device may display information 3920 of a music file which is automatically executed in the exercise mode. In the exercise mode, if a heart rate or consumed caloric is previously set to be measured, the wearable device may display, in the display, pieces of measurement information 3930 and 3940 about the heart rate and the consumed calorie. The displayed pieces of information may be changed by the user, AND information about a plurality of applications may be displayed together.

As illustrated in FIG. 40, the wearable device may display state information about an automatically executed application. If a heart rate previously set to be measured in switching a mode to the exercise mode, the wearable device may display a case where the heart rate is out of a normal range, thereby proposing adjusting a degree of exercise. of a user. When a wearing length is unsuitable for the measurement mode, the wearable device may perform display to adjust the wearing length.

FIG. 41 is a flowchart illustrating a process of adjusting a length in a wearable device according to an exemplary embodiment.

In operation S4110, when a setting mode switching input is received by the wearable. device or an environment which satisfies a switching condition is provided, the wearable device may switch a setting mode. For example, the normal mode may be switched to the sleeping mode by a user, or when position information indicating a fitness center is received from a position sensor of the wearable device, the wearable device may switch a mode to the exercise mode.

In operation S4120, the wearable device may determine a wearing length of the wearable device corresponding to the switched setting mode. As shown in Tables 1 and 2, setting mode information based on wearing lengths may be stored in the storage of the wearable device. In detail, wearing lengths for users may differ, and thus, wearing length information may be stored for each user.

In operation S4130, the wearable device may adjust a wearing length of the wearable device to the determined wearing length. When an adjustment command signal for adjusting a wearing length to a certain wearing length is received for the length adjusting module 30, the electronic module 10 may autonomously adjust a wearing length.

As described above, the length adjusting module 30 may change contact positions of the first, connectors 311a to 311c of the first fastening unit 310 and the second connector 321 of the second fastening unit 320 by using an elastic force, a magnetic force, or a motive force generated by a motor.

FIGS. 42 to 44 are diagrams illustrating a method of adjusting a length in a wearable device according to an exemplary embodiment.

As illustrated in FIG. 42, the wearable device may display wearing length information 4230 in addition to currently switched mode information 4210 and switching completion information 4220. The wearing length information 4230 may denote wearing length information which is to be adjusted later and may be displayed along with current wearing length information. The wearable device may display information 4240 for checking adjustment of a wearing length and cancelation selection information 4250 along with the wearing length information 4230, thereby enabling a user to again check whether to adjust a wearing length.

Wearing length information may be previously stored in the storage of the wearable device, and thus, the length adjusting module 30 of the wearable device may adjust a wearing length to a wearing length corresponding to a mode which is to be switched from a current mode.

As illustrated in FIG. 43, when the wearable device senses a wearing state of a user and determines that the sensed wearing state corresponds to a predetermined condition, the wearable device may adjust wearing length. Unlike that a mode is switched by a switching input of the user, the wearable device may determine wearing state information to adjust a wearing length. As illustrated in the drawing, when heartrate measurement information exceeding a reference range is received from a heart rate measurement sensor, the wearable device may adjust and increase a wearing length to provide a wearing environment suitable for the user.

The wearable device may adjust a wearing length, based on various conditions. When a contact pressure for a wearing part of a user is measured as exceeding a reference range, the wearable device may adjust and increase a wearing length. Alternatively, when indoor illuminance sensed by an illumination sensor is low, the wearable device may determine a current state as a sleeping state and may adjust and increase a wearing length. Even when a tension measured by a tension sensing module that measures a tension of the wearable device exceeds a reference range, the wearable device may adjust and increase a wearing length.

As illustrated in FIG. 44, when a mode is switched to the measurement mode, the wearable device may adjust a wearing length to a wearing length suitable for the measurement mode. In the measurement mode, the wearable device may adjust and reduce the wearing length for accurate measurement. After measurement is finished, the wearable device may again adjust and increase a wearing length.

The wearable device may adjust a wearing length to a wearing length suitable for a user, based on pieces of sensing information from various sensors. For example, when it is determined that a current position sensed by a position sensor of the wearable device is a fitness center, the wearable device may switch a mode to the exercise mode and simultaneously adjust a wearing length to a wearing length corresponding to the exercise mode. Alternatively, when a body temperature of the user sensed by a temperature sensor is higher than that in a normal state or an amount of excreted sweat is higher than that in the normal state, the wearable device may increase a wearing length, thereby providing a pleasant wearing state to the user.

FIG. 45 is a diagram illustrating a glasses type wearable device according to an exemplary embodiment.

In FIGS. 12 to 44, for convenience of a description, a watch type wearable device has been described above as an example. However, in the present disclosure, a wearable device may have various, forms. Therefore, the wearable device may be a wearable device having various forms such as an earphone form, a glasses form, a ring form, a belt form, a band form, etc., and may be a wearable device where a wearing length may be adjusted.

FIG. 46 is a diagram illustrating a screen displayed by a glasses type wearable device according to an exemplary embodiment.

As illustrated in FIG. 46, the glasses type wearable device may include a display. The display may display various pieces of information such as the above-described mode setting icon and/or the like. Details displayed by the display have been described above in detail, and thus, their detailed descriptions are not repeated.

FIGS. 47 and 48 are block diagrams conceptually illustrating a structure of a wearable device 4700 according to an exemplary embodiment.

The wearable device 4700 according to an exemplary embodiment may include a controller 4710, a display 4720, a storage 4730, a sensing unit 4740, and a driver 4750. The controller 4710 according to an exemplary embodiment may be configured by a central processing unit (CPU) 4712, a signal processor 4714, a read-only memory (ROM) 4716, and a random access memory (RAM) 4718. The CPU 4712 of the controller 4710 may perform various operations described in the present disclosure, and the controller 4710 may include elements respectively corresponding to the operations. The controller 4710 may include elements illustrated in FIG. 47. The controller 4710 may include various other elements necessary to execute a program. On the other hand, some of the elements may be omitted.

The CPU 4712 may connect the elements and control overall operations of the elements by transmitting and receiving a control signal and data. The CPU 4712 may control an element group configuring a program stored in the RAM 4716, thereby realizing a desired operation. The CPU 4712 may control the elements illustrated in FIG. 47.

The CPU 4712 may perform arithmetic operations such as addition, subtraction, multiplication, and division, logic operations such as an OR operation, a NAND operation, and an NOR operation, and a bit operation such as a bitwise operation, bit/bit inversion, bit shill, and bit rotation for a register by using an arithmetic logic unit (ALU). The CPU 4712 may be configured to perform saturation operations such as addition, subtraction, multiplication, and division and a vector operation such as a trigonometric function at a high speed, for multimedia processing. The CPU 4712 may include a coprocessor for performing an arithmetic operation at a high speed.

The ROM 4718 may store an initial program loader (IPL) which is driven immediately after power is applied. The CPU 4712 may drive the IPL to read a program stored in the ROM 4718. The CPU 4712 may store the read program in the RAM 4716 and perform processing necessary for execution of the program. The ROM 4718 may store various data and a program of an operating system (OS) necessary for a control of a wearable device.

The RAM 4716 may temporarily store data or a program. The RAM 4716 may store a program which is read from the ROM 4718 or a recording medium, data based on the program, and data associated with communication. The CPU 4712 may provide a variable region in the RANI 4716 and may directly perform an arithmetic operation on a value stored in the variable region. The. CPU 4712 may store a value, which is stored in the RAM 4716, in the register and then perform an arithmetic operation for the register to transfer a result of the arithmetic operation to a memory.

The controller 4710 according to an exemplary embodiment may further include other hardware or software in addition to the above-described elements. For example, the controller 4710 may perform parallel processing by using a plurality of CPUs instead of the single CPU. 4712, thereby increasing a calculation speed. On the other hand, the controller 4710 may not include some of the above-described elements.

Programs according to an exemplary embodiment may be loaded from the ROM 4718 into the RAM 4716, but is not limited thereto. All or some of the programs according to an exemplary embodiment may be loaded from a computer which is connected to a network and is located at a remote position. All or some of pieces of data which are used in relation to the programs according to an exemplary embodiment may be, loaded from a computer (a server) which is connected to a network and is located at a remote position.

The display 4720 according to an exemplary embodiment may display data obtained through processing by a device at a user interface (UI) environment. In addition, when a manipulation command of a user of a terminal is needed, the display 4720 may display information, which guides the user to input various manipulation commands, on a screen.

The storage 4730 according to an exemplary embodiment may store pieces of information obtained through processing by the controller 4710. Also, the storage 4730 may store pieces of information sensed by the sensing unit 4740 and also store information received from another device. The pieces of information may be classified and stored in the storage 4730 in a DB form.

The sensing unit 4740 according to an exemplary embodiment may sense various pieces of internal or external information of the wearable device 4700. The sensing unit 4740 may include various sensors such as a temperature and humidity sensor, an atmospheric pressure sensor, a pressure sensor, a position sensor (a GPS sensor or the like), a tension sensor, a heart rate measurement sensor, a blood pressure measurement sensor, an acceleration sensor, a piezo sensor, and/or the like. The temperature and humidity sensor may measure an internal or external temperature or humidity of the wearable device 4700. The atmospheric pressure sensor may measure atmospheric pressure at a current position, and the pressure sensor may measure pressure applied to the wearable device 4700. The position sensor may measure a current position by using a satellite or a network and also measure a current position by using an access, point (AP) located in a building. The tension sensor may measure a tension applied to a connection module or a length adjusting module of the wearable device 4700. The acceleration sensor may measure an acceleration based on a movement of the wearable device 4700, and the piezo sensor may sense sound, vibration, pressure, and/or the like and convert the sensed sound, vibration, or pressure into an electrical signal. The piezo sensor may convert vibration, applied to the wearable device 4700, into electrical energy.

The driver 4750 according to an exemplary embodiment may adjust a wearing length. The driver 4750 may include the above-described length adjusting module. The driver 4750 may cause an external appearance of the wearable device 4700 to be adjusted by an internal physical force of the wearable device 4700 or an external physical force applied from a user. Therefore, driving, may be divided into manual driving based on an external force and automatic driving performed by the driver 4750 having a driving force 4750. In the automatic driving, like a motor, the driver 4750 may convert electrical energy into kinetic energy or perform length adjustment according to an attracting/repulsing force based on an elastic force, a magnetic force, and/or the like.

In FIG. 48, the wearable device 4700 according to an exemplary embodiment may further include a communication unit 4760. The communication unit 4760 may be used to communicate with an external device 4800. For example, data representing a heart rate of a user may be transmitted to the external device 4800. Therefore, a user may measure a heart rate of the user and may transmit the measured heart rate to a medical worker located at a remote place.

Some of element groups of various hardware and software may be omitted within the scope understandable by one of ordinary skill in the art. On the other hand, an additional element may be further used. Some of element groups of hardware and software may be grouped into a single element and driven. On the other hand, one of element groups of hardware and software may be performed as a plurality of element groups.

The above-described exemplary embodiments may be written as computer programs and may be implemented in general use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc), and transmission media such as Internet transmission media.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing, from the spirit and scope as defined by the following claims.

We claim:

1. An operating method of a wearable device including a module for adjusting a length of the wearable device, the operating method comprising:
    determining, by the wearable device, a length of the wearable device, based on electrical connection information between a first fastener and a second fastener of the wearable device;
    determining, by the wearable device, whether the determined length corresponds to one of a plurality of preset lengths for a user, each preset wearing length for the user corresponding to one of a plurality of different applications executable by the wearing device;
    based on determining that the determined length corresponds to one of the plurality of preset lengths for the user, executing, by the wearable device, the application corresponding to the determined length; and
    outputting, by the wearable device, information with respect to the executed application.

2. The operating method of claim 1, further comprising blocking execution of any of the different applications, based on determining that the determined length corresponds to none of the preset wearing lengths.

3. The operating method of claim 1, further comprising:
    obtaining user ID information based on a user input;
    identifying a user of the wearable device based on the obtained user ID information;
    determining whether the determined length corresponds to one of a plurality of preset lengths of the identified user; and
    executing an application corresponding to the identified user based on the determined wearing length, based on determining that the determined length corresponds to one of preset lengths for the identified user.

4. The operating method of claim 1, further comprising:
    determining, by the wearable device, an operating mode corresponding to the determined length;
    executing, by the wearable device, an application corresponding to the determined operating mode; and
    outputting, by the wearable device, information corresponding to the determined operating mode.

5. The operating method of claim 4, wherein the operating mode of the wearable device comprises one or more selected from a normal mode, a sleeping mode, an exercise mode, or a measurement mode.

6. The operating method of claim 4, further comprising, based on the determined operating mode being the sleeping mode, performing a setting to terminate a certain function being executed by the wearable device.

7. The operating method of claim 6, wherein the certain function comprises one or more selected from a position sensing function, an atmospheric pressure sensing function, a temperature sensing function, a Wi-Fi function, or a Bluetooth function.

8. A wearable device comprising:
    a processor configured to:
        determine a length of the wearable device, based on electrical connection information between a first fastener and a second fastener of the wearable device;
        determine whether the determined length corresponds to one of a plurality of preset lengths for a user, each preset wearing length for the user corresponding to one of a plurality of different applications executable by the wearing device;
        based on determining that the determined length corresponds to one of the plurality of preset lengths for the user, execute the preset application corresponding to the determined wearing length; and
        output information with respect to the executed applicatin.

9. A non-transitory computer-readable recording medium having recorded thereon a program which, when executed, by a processor of a wearable device, causes the wearable device to execute:
    determining a length of the wearable device based on electrical connection information between a first fastener and a second fastener of the wearable device;
    determining whether the determined length corresponds to one of a plurality of preset lengths for a user, each preset wearing length for the user corresponding to one of a plurality of different applications executable by the wearing device;

based on determining that the determined length corresponds to one of the plurality of preset lengths for the user, executing the preset application corresponding to the determined length; and outputting information with respect to the executed application.

* * * * *